US008312483B2

(12) United States Patent
Barish

(10) Patent No.: US 8,312,483 B2
(45) Date of Patent: Nov. 13, 2012

(54) PRESENTING MEDIA CONTENT TO A PLURALITY OF REMOTE VIEWING DEVICES

(76) Inventor: Keith Barish, New York, NY (US)

( * ) Notice: Subject to any disclaimer, the term of this patent is extended or adjusted under 35 U.S.C. 154(b) by 365 days.

(21) Appl. No.: 12/477,548

(22) Filed: Jun. 3, 2009

(65) Prior Publication Data

US 2009/0300670 A1    Dec. 3, 2009

Related U.S. Application Data

(60) Provisional application No. 61/101,949, filed on Oct. 1, 2008, provisional application No. 61/058,367, filed on Jun. 3, 2008.

(51) Int. Cl.
*H04N 7/16* (2011.01)
(52) U.S. Cl. .......................................................... 725/23
(58) Field of Classification Search ...................... 725/23
See application file for complete search history.

(56) References Cited

U.S. PATENT DOCUMENTS

| | | | |
|---|---|---|---|
| 5,855,008 | A | 12/1998 | Goldhaber et al. |
| 6,514,139 | B2 | 2/2003 | Levitan |
| 6,681,393 | B1 | 1/2004 | Bauminger et al. |
| 6,760,916 | B2 | 7/2004 | Holtz et al. |
| 6,766,524 | B1 | 7/2004 | Matheny et al. |
| 7,043,746 | B2 | 5/2006 | Ma |
| 7,216,156 | B2 | 5/2007 | Chatani |
| 7,370,017 | B1 | 5/2008 | Lindeman et al. |
| 7,398,319 | B2 | 7/2008 | McIntyre |
| 7,403,906 | B2 | 7/2008 | Coleman |
| 2002/0083437 | A1 | 6/2002 | Fiore et al. |
| 2002/0133817 | A1 | 9/2002 | Markel |
| 2002/0165793 | A1 | 11/2002 | Brand et al. |
| 2002/0198929 | A1 | 12/2002 | Jones et al. |
| 2003/0040960 | A1 | 2/2003 | Eckmann |

(Continued)

FOREIGN PATENT DOCUMENTS

CA    2279013    5/2001

(Continued)

OTHER PUBLICATIONS

"Behavioral Advertising Tracking, Targeting & Technology", United States Federal Trade Commission; New Jersey Avenue, N.W.; Washington, D.C; Available at: http://www.ftc.gov/opa/2008/03/tech.shtm, (Nov. 2, 2007), 1 pg.

(Continued)

*Primary Examiner* — Bennett Ingvoldstad
(74) *Attorney, Agent, or Firm* — Schwegman Lundberg & Woessner, P.A.

(57) ABSTRACT

Methods and systems for processing and provisioning media content for display on a viewer device are provided. An example method may comprise accessing an advertisement database to obtain a plurality of advertisement media components. The advertisement media components may be provided by an advertisement provider that pays to have the advertisement media components accessible. An entertainment database may be accessed to obtain a plurality of entertainment media components, the plurality of entertainment media components being provided by an entertainment provider that receives payment to make the entertainment media components accessible. Thereafter, the entertainment media components may be interspersed between the advertisement media components to provide viewer media content. An award associated with the viewer media content may be selectively allocated and the media content is communicated to at least one viewer device for viewing. A notification may be sent to the viewer device when the award has been awarded.

23 Claims, 20 Drawing Sheets

U.S. PATENT DOCUMENTS

| | | |
|---|---|---|
| 2003/0172376 A1 | 9/2003 | Coffin |
| 2003/0226142 A1* | 12/2003 | Rand .............................. 725/32 |
| 2004/0031046 A1 | 2/2004 | Weinblatt |
| 2004/0255322 A1 | 12/2004 | Meadows et al. |
| 2005/0091160 A1 | 4/2005 | Kitze et al. |
| 2005/0216346 A1* | 9/2005 | Kusumoto et al. .............. 705/14 |
| 2005/0273828 A1 | 12/2005 | Barton |
| 2006/0010476 A1 | 1/2006 | Kelly et al. |
| 2006/0020963 A1 | 1/2006 | Weinblatt et al. |
| 2006/0037039 A1 | 2/2006 | Aaltonen |
| 2006/0095337 A1 | 5/2006 | Morgan |
| 2006/0101499 A1 | 5/2006 | Aravamudan et al. |
| 2006/0183551 A1 | 8/2006 | Prudent |
| 2006/0183559 A1 | 8/2006 | Gross |
| 2006/0218577 A1* | 9/2006 | Goodman et al. .............. 725/32 |
| 2006/0224452 A1 | 10/2006 | Ng |
| 2006/0255322 A1 | 11/2006 | Wu et al. |
| 2006/0294547 A1 | 12/2006 | Bon et al. |
| 2007/0130011 A1 | 6/2007 | Postrel |
| 2007/0146812 A1 | 6/2007 | Lawton |
| 2007/0208751 A1 | 9/2007 | Cowan et al. |
| 2007/0226368 A1 | 9/2007 | Strickland |
| 2007/0239546 A1 | 10/2007 | Blum et al. |
| 2007/0265919 A1 | 11/2007 | Jarjour |
| 2007/0276729 A1 | 11/2007 | Freer |
| 2007/0288951 A1* | 12/2007 | Ray et al. ......................... 725/23 |
| 2007/0293307 A1 | 12/2007 | DeRosa-Grund et al. |
| 2007/0294340 A1 | 12/2007 | Rothschild |
| 2008/0010135 A1 | 1/2008 | Schrock |
| 2008/0040228 A1 | 2/2008 | Gutierrez |
| 2008/0046312 A1 | 2/2008 | Shany et al. |
| 2008/0052340 A1 | 2/2008 | Hallmark |
| 2008/0059997 A1 | 3/2008 | Plotnick et al. |
| 2008/0097839 A1 | 4/2008 | Koren et al. |
| 2008/0127249 A1 | 5/2008 | Cruice |
| 2008/0140491 A1 | 6/2008 | Jain et al. |
| 2008/0140502 A1 | 6/2008 | Birnholz et al. |
| 2008/0162233 A1 | 7/2008 | Rothschild |
| 2008/0167106 A1 | 7/2008 | Lutnick |
| 2008/0172291 A1 | 7/2008 | Hurowitz et al. |
| 2008/0175190 A1 | 7/2008 | Lee et al. |
| 2008/0176650 A1 | 7/2008 | Wolf et al. |
| 2008/0177617 A1 | 7/2008 | Gupta |
| 2008/0178238 A1 | 7/2008 | Khedouri et al. |
| 2008/0183803 A1 | 7/2008 | Hassett et al. |
| 2008/0183804 A1* | 7/2008 | Hassett et al. ................ 709/203 |
| 2008/0244666 A1* | 10/2008 | Moon et al. ...................... 725/87 |

FOREIGN PATENT DOCUMENTS

| | | |
|---|---|---|
| JP | 2006197106 A | 7/2006 |
| JP | 2007150382 A | 6/2007 |
| JP | 2007219860 A | 8/2007 |
| KR | 20010070020 A | 7/2001 |
| KR | 20010094698 A | 11/2001 |
| KR | 20020076050 A | 10/2002 |
| KR | 20020089115 A | 11/2002 |
| KR | 20030060128 A | 7/2003 |
| KR | 20030079150 A | 10/2003 |
| WO | WO-0239204 A2 | 5/2002 |
| WO | WO-2006023734 A2 | 3/2006 |
| WO | WO-2008021704 A2 | 2/2008 |

OTHER PUBLICATIONS

"Brandport (Web Site with Sweepstakes for Viewing Ads)", Available at: http://www.brandport.com, (Accessed Jun. 5, 2009), 2 pgs.

"Bux.to (Web Site That Pays Users to View Ads", Available at: http://www.bux.to/, Web Site That Pays Users to View Ads, (Accessed Jun. 5, 2009), 1 pg.

"Cambrian House (Web Site Describing Idea of Prize/Contest for Viewing Ads on Cable TV)", Available at: http://www.cambrianhouse.com/idea/idea-promoter/ideas-id/tcqKAzy/, (Jul. 14, 2007), 8 pgs.

"Gaming Revenue: 10 year trends, American Gaming Association, Industry Information, Fact Sheet: Statistics", (Accessed Jul. 29, 2008), 1 pg.

"Gaming Revenue: Current year data, American Gaming Association, Industry Information, Fact Sheet: Statistics", (Jul. 29, 2008), 1 pg.

"Inside Microsoft's War Against Google (Businessweek article)", (May 8, 2008), 37-40.

"Instant Win Crazy—Free Sweepstakes—Instant Wins—Contests for Prizes (", (Accessed Apr. 29, 2008), 5 pgs.

"LBV (Web Site with Incentive System for Viewing Ads)", Available at: http://www.leadsbyvideo.com, (Accessed Jun. 5, 2009), 1 pg.

"Mintshot.com web pages (10)", Available at: http://www.mintshot.co.nz/, (Accessed 2007), 10 pgs.

"New SmartAds: The Future of Graphical Advertising at Yahoo", Available at: http://searchengineland.com/new-smartads-the-future-of-graphical-advertising-at-yahoo-11607, (Jul. 2, 2007), 3 pgs.

"North American Association of State and Provincial Lotteries (NASPL)—Sales and Profits", (Jul. 29, 2008), 3 pgs.

"Protecting Consumers in the Next Tech-ade: A Report by the Staff of the Federal Trade", Available at: http://www.ftc.gov/os/2008/03/P064101tech.pdf, (Mar. 28, 2008), 2 pgs.

"Session (computer science)", *From Wikipedia, the free encyclopedia*, (Accessed Apr. 25, 2008), 3 pgs.

"Sweepstakes", *From Wikipedia, the free encyclopedia*, (Accessed Apr. 3, 2008), 6 pgs.

"ViewAMillion.Ads.com is giving away over 1.5 Million Dollars in prize money in the largest internet contest for viewing ads! (Advertisement, Article/ Press Release describing ViewAMillion.Ads.com)", Available at: http://www.w3reports.com/index.php?itemid=1687&catid=11, Webreports News for Webcasters webpage, http://www.w3reports.com, (Mar. 10, 2007), 1 pg.

"Windough.com Introduces New Advertising Packages (Business Wire article Describing Windough.com.)", Available at: http://findarticles.com/articles/mi_m0EIN/is_2000_July_28/ai_63740964, (Jul. 28, 2000), 2 pgs.

Calvin Woon & Eddie, "7 Killer Traffic Tactics", Available at: http://www.horsebarnwelding.com/7-Killer-Traffic-Tactics_Rebranded.pdf, (Accessed Jun. 8, 2009), 22 pgs.

Covell, M., et al., "Detecting Ads in Video Streams Using Acoustic and Visual Cues", *Computer*, 39 (12), Available at: http://www.mangolassi.org/covell/pubs/computer_Dec06.pdf, (2006), 135-137.

Duan, Ling-Yu, et al., "Digesting Commercial Clips from TV Streams", *Multimedia, IEEE*, 15 (1), (Jan.-Mar. 2008), 28-41.

Dumlao, Michael Raymund, "The virtuous consumer: Using social network technologies to foster the public space of markets", *A Thesis submitted to the Faculty of the Graduate School of Arts and Sciences of Georgetown University in partial fulfillment of the requirements for the degree of Master of Arts in Communication, Culture and Technology*, Washington, DC Available at: http://dspace.wrlc.org/bitstream/1961/3697/1/etd_mrd34.pdf, (Apr. 27, 2004), 104 pgs.

Gao, Jerry Zeyu, et al., "SmartMobile-AD: An Intelligent Mobile Advertising System", *The 3rd International Conference on Grid and Pervasive Computing Workshops*, 2008, 164-171.

Macedonia, M, "Google becomes an entertainment company", *IEEE Xplore*, 39 (2), (Feb. 2006), 101-103.

McDavid, Doug, "Sociable technologies for enterprising sociality", Elk Grove, CA 95624, Available at: http://journals.isss.org/index.php/proceedings52nd/article/viewFile/1073/323, (Jul. 2008), 32 pgs.

McEntee, Claire, "Mintshot offers prizes to watch ads (Advertisement, The Dominion Post)", Available at: http://www.stuff.co.nz/4269682a28.html, (Nov. 12, 2007), 2 pgs.

Parameswaran, Manoj, et al., "Social computing: an overview", *Communications of the Association for Information Systems* (vol. 19,2007), http://cism.mccombs.utexas.edu/data/papers/Parameswaran_Social%20Computing_CAIS07.pdf, (2007), 762-780.

Skageby, Jorgen, "Gifting Technologies—Ethnographic Studies of End-users and Social Media Sharing", *Department of Computer and Information Science; Linkopings universitet*, Linkoping, Sweden, Available at: http://liu.diva-portal.org/smash/record.jsf?pid=diva2:18271, (2008), 100 pgs.

* cited by examiner

FROM: KEITH /— 312

HI MIKE,
I SAW THIS ...

BEST,
KEITH

I HAVE APPORTIONED ANY AWARDS YOU MIGHT WIN WHILE VIEWING THE VIDEOS AS FOLLOWS:
/— 316

ME | 50 % v |— 320
YOU | 10 % v |— 322
CHARITY | 40 % v |— 324

| ACCEPT |— 318

IF YOU ACCEPT THIS APPORTIONMENT CLICK ON THE ACCEPT BUTTON. IF NOT, PLEASE PROPOSE A
DIFFERENT APPORTIONMENT AND CLICK ON THE NEW PROPOSAL BUTTON BELOW

| NEW PROPOSAL |— 326

PRESENTING MEDIA CONTENT TO A PLURALITY OF REMOTE VIEWING DEVICES

CLAIM OF PRIORITY

The present application claims the benefit under 35 U.S.C. 119(e) of U.S. Provisional Patent Application Ser. No. 61/058,367 filed Jun. 3, 2008, and U.S. Provisional Patent Application Ser. No. 61/101,949, filed Oct. 1, 2008, applications of which are incorporated herein by reference in their entirety.

FIELD

The present disclosure relates to systems, apparatus and methods for presenting media content to a plurality of remote viewing devices and processing rewards associated with the media content.

BRIEF DESCRIPTION OF THE DRAWINGS

FIG. 11 shows a graphical user interface, in accordance with an example embodiment, for presenting a share media invite to another user.

DETAILED DESCRIPTION OF EXAMPLE EMBODIMENTS

Figure 1:
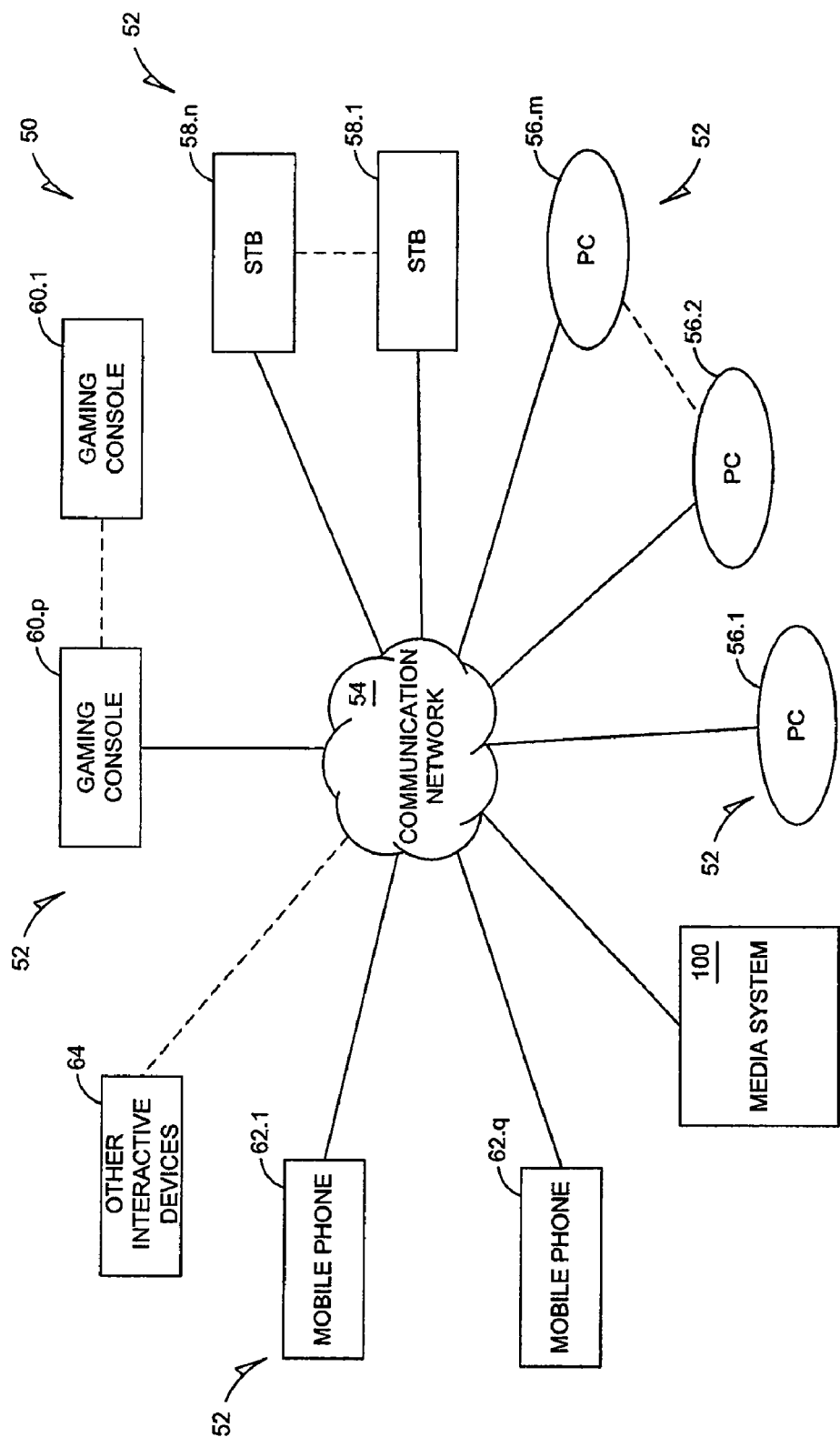
FIG. 1 shows a schematic block diagram of a media processing and provisioning system in accordance with an example embodiment.

In an example embodiment, systems, method and devices to present media content to a plurality of remote viewing devices are described. The media content may, for example, include advertisements and entertainment videos that have awards associated therewith. Thus, a user may view the media content on a remote viewing device (e.g., an interactive remote device) and may then win an award. In an example embodiment, the award may be shared with a charity. Further, a first user may share (e.g., forward) the media content, or part thereof, with a second user and, optionally, share in any award that the second user may receive. In an example embodiment, users may negotiate the proportions in which the award is shared (e.g., 50% to a selected charity, 10% to the first user, and 40% to the second user). In an example embodiment where the media content is shared with multiple users, the first user who initiates the multiple sharing may share in an award received by any one or more of the multiple users.

The media content may be video content including an advertisement media component and an entertainment media component. The advertisement media component may include an advertisement video work and/or sequence of static images. In an example embodiment, the duration of each advertisement media component is longer than the duration of each entertainment media component. The entertainment media component may be a non-advertisement media component. In an example embodiment, the advertisement media component corresponds to advertising content from an advertisement content provider (e.g., an advertising agency) that pays to have the advertising distributed in the system. In contrast, in another example embodiment, an entertainment content provider need not pay for the entertainment content to be distributed in the system. Further, the entertainment content provider may be paid for the entertainment content.

The term "award" is intended to include any financial benefit, an opportunity to win a financial benefit, monetary or otherwise. For example an award may include an entry into a sweepstakes, a monetary award (which may, for example, be gifted at least in part to a charitable organization), or the like. In an example embodiment, the user may win an instant prize (and/or be entered into a sweepstakes) as a result of viewing the media content. For example, when a user finishes viewing an advertisement (or skips ahead to the next advertisement media component), a graphical user interface (GUI) displaying the media stream may announce a prize. In an example embodiment, a portion of the displayed video component may be highlighted and a selection option may be provided in the GUI to allow a user to claim the prize. For example, the bumper of a car in an advertisement could become highlighted if the user wins a prize and the user could claim the prize by clicking on the highlighted bumper. The term "prize" is intended to be interpreted broadly, and could be money, a product, a service, test driving an automobile, a vacation, a free airline flight, talking to a celebrity or screen star, or anything that would be considered desirable to obtain, receive, access or participate in. The type of prize is not limiting on the example embodiments.

The term "advertisement video work" is intended to include any video, moving picture, or live presentation that provides information about a product or service. It may also show the product or service's use or otherwise promote the product or service in some manner. The "advertisement video work" must be capable of being transmitted electronically. It should be noted that the subject matter or manner of portrayal or presentation should not be construed as limiting on the example embodiments described herein. The term "advertisement video work" includes banner ads shown on only a portion of a display screen. The advertisement video work may, but need not include an audio component. Such advertisement video works may be prerecorded, or in an example embodiment, could be live feeds from the advertising content provider or could be dynamically created on-the-fly and presented to a user (herein also referred to as a viewer) with the authorization of the content provider. By way of example, the advertisement video work may comprise conventional moving picture advertisements, a movie trailer, a short film where the lead character uses an automobile of a particular type or wears sunglasses of a particular brand, daily or weekly specials, to name but a few. The type of advertisement provided in the advertisement video work should not be construed as limiting on the example embodiments described herein.

The term "advertisement sequence of static images" is intended to include a sequence of images providing information about a product or service, or showing its use or otherwise promoting the product or service in some manner and be capable of being transmitted electronically. In an example embodiment, the static images may comprise pages of an online magazine. The sequence of static images may be designed to advance in response to a viewer's input. Such an advertisement sequence of static images may be prerecorded, or in an example embodiment, may be a live feed from the advertising content provider or with its authorization or could be dynamically created on-the-fly and presented to the viewer. Further, it should be noted that this term requires that there be a sequence of images, but does not preclude movement of a figure or other element in one or more portions of the static image. It may require advancement to the next static image in the sequence, similar to moving page-by-page in a magazine. In an example embodiment, buttons or other user input elements may be provided within the static images that may be activated or selected or otherwise interacted with by the viewer.

The advertisement video work and the sequence of static images may include graphical advertising wherein advertisements to be sent to viewers across the web are designed based on the demographic and geographic profiles of an individual viewer. The advertisements may, in addition or instead, be based on search and web browsing behaviors of the viewer. In an example embodiment, different templates directed to different demographic profiles are selected based on these profiles and a person's viewing history and put together into a coherent video work. Accordingly, in an example embodiment, advertisement video works are customized based upon various factors including user profile information, technographic information, geographic information, demographic information and user interaction information. This information may either be stored on the user's computer, one or more server computers, or obtained from the user's interaction with a Web page containing the advertisement. Once information associated with the viewer is obtained, customized advertisement content may be selected from Web server computers and the advertisement may be dynamically constructed and displayed on the viewer's computer.

In an example embodiment, media components may be sent to a viewing device in the form of a unicast or broadcast media stream. The advertisement media components may be commercials (e.g., one or more 30 second commercial) corresponding to paid-for advertising. The☐entertainment media components (e.g., one or more non-advertisement media components) may be interspersed between the advertisement media components. In an example embodiment, the cumulative duration of the entertainment media components in the media stream is substantially less than the cumulative duration of the advertisement media components. For example, a sequence of three 30 second advertisement media components may be followed by a 30 second entertainment media component. Hence, the cumulative duration of the advertisement media components in the given example sequence is 90 seconds whereas the duration of the entertainment media component is 30 seconds. In an example embodiment, one or more entertainment media components may be randomly interspersed for 2 minutes or less after no more than 6 continuous advertisement media components are provided. The entertainment media components may be at regular or irregular intervals in a media stream providing the media content. In an example embodiment entertainment media components may be sponsored by advertisers who may get a "presentation credit" (audio and/or textual) like a movie studio (e.g., BMW presents . . . ) that may include the same kind of introduction that the studios do before the beginning of a movie sequence.

Referring to FIG. 1, reference 50 generally indicates a media processing and provisioning system in accordance with an example embodiment. The system 50 is shown, by way of example, to include a plurality of viewing devices in the form of interactive devices 52 that are networked via a communication network 54 to a media system 100. The media system 100, also in accordance with an example embodiment, may be configured to provide media content and, as mentioned above, the media content may include advertisement media components and entertainment media components. The advertisement media components may be advertisement video works and the entertainment media components may be entertainment videos that may be selectively viewed on any one or more of the interactive devices 52. The communication network 54 may, for example, be the Internet and, accordingly, each interactive device 52 may include appropriate browsing software to communicate with the media system 100. In an example embodiment, awards may be awarded to a viewer viewing the advertisement videos and the entertainment videos.

The interactive devices 52 include, but are not limited to, a plurality of personal computers (PCs) 56.1-56.*m* a plurality of set-top boxes (STBs) 58.1-58.*n*, a plurality of gaming consoles 60.1-60.*p*, a plurality of mobile phones 62.1-62.*q*, and other interactive and/or viewing devices 64. As described in more detail below, each interactive device 52 may include a display for displaying media content and a user interface to receive user inputs from a viewer. In the systems and methods described by way of example herein, the term "interactive device" and "viewer device" may be used interchangeably.

Figure 2:
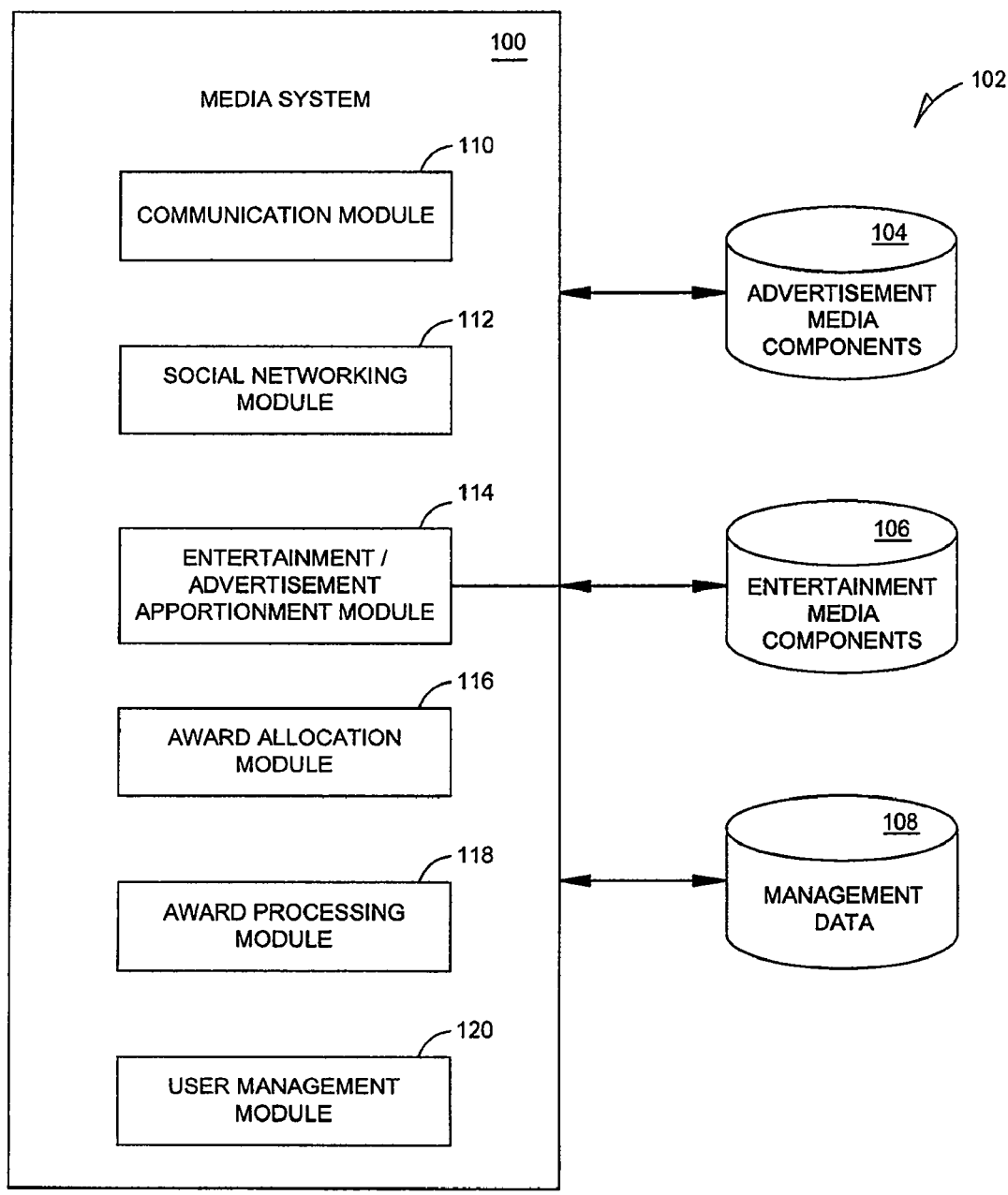
FIG. 2 shows a schematic block diagram a media system, in accordance with an example embodiment, that may be used in the media processing and provisioning system shown in FIG. 1.

FIG. 2 is a schematic view of the media system 100. As the media system 100 may be deployed in the system 50 of FIG. 1, and is described by way of example with reference thereto.

As shown in FIG. 2, the media content may be stored in a plurality of databases 102 which are accessible to, or may form part of, the media system 100. For example, the media databases 102 may include an advertisement database 104 in which a plurality of advertisement media components are stored, an entertainment database 106 in which a plurality of entertainment media components are stored, and a management database 108 in which, inter alia, system management data is stored. It should be appreciated that the databases 104-108 may be combined into a single database or any number of separate databases and are shown merely by way of example as three databases in FIG. 2. Further, one or more of the databases 104-108 may be locally provided and/or remotely provided.

The advertisement database 104 may include advertising material provided by advertisers or any other media publisher. In an example embodiment, the advertisement media components are videos that one or more advertisers have paid to host on the system 50. In an example embodiment, the entertainment media components provided in the entertainment database 106 may be contrasted to the advertisement media components in that they are not paid for by the provider of the entertainment media. In an example embodiment, providers of the entertainment media components may be paid in order to host their entertainment videos on the system 50. The management database 108 may include various tables and management data used by the media system 100. As described in more detail below, the management database 108 may include user password details, logon details, other user information, records of awards that have been awarded by the media system 100 to users, or the like.

The media system 100 may, for example, comprise one or more servers that are networked to the communication network 54. As shown by way of example in FIG. 2, the media system 100 includes a communication module 110 to interface the media system 100 to the communication network 54, a social networking module 112 that includes one or more software modules to allow social network communications between a plurality of users of the system 50, an entertainment/advertisement apportionment module 114, an award allocation module 116, an award processing module 118, and a user management module 120.

The entertainment/advertisement apportionment module 114 may apportion a time duration or percentage of advertisement media components provided to the user as opposed to a time duration or percentage of entertainment media components provided to the user. In an example embodiment, the entertainment/advertisement apportionment module 114 obtains advertisement media components from the advertisement database 104 and entertainment media components from the entertainment database 106. As described in more detail below, in an example embodiment, a user may, utilizing a graphical user interface, to define or select the duration or apportionment between advertisement media components and entertainment media components. In an example embodiment, the entertainment/advertisement apportionment module 114 may include algorithms to select advertisement media components and/or entertainment media components, arranged the media components based on rules and/or algorithms, and perform other related functionality.

The award allocation module 116 may include one or more algorithms for allocating rewards to a user viewing a stream of advertisement media components that are interspersed with entertainment media components. It is to be noted that awards may be allocated at different time periods (e.g., before a viewing session, during a viewing session, and after a viewing session). The social networking module 112 may allow a user to recommend advertisement and/or entertainment media components to one or more other users forming part of a viewer's social network. In an example embodiment, the award processing modules records and manages awards and updates management data stored in the management database 108. The user management module 120 may perform general management functionality. One or more of the modules 110-120 may be combined and, optionally, provided by software being executed on a computer.

In an example embodiment, the media system 100 may include tracking functionality. For example a tracking module (e.g., that may form part of the user management module 120) may be provided. The tracking module may track media components (e.g., advertisement and/or media components) sent to the interactive devices 52, what media components are viewed by each viewer, awards allocated, demographics of the users, selections of entertainment and/or advertisement categories (e.g., made by a user), and any other aspects of the media system 100. Data derived from the tracking functionality may be used to determine remuneration provided to an entertainment media component provider, a cost to an advertiser to present advertisement media components via the system 50, or the like.

Figure 3:
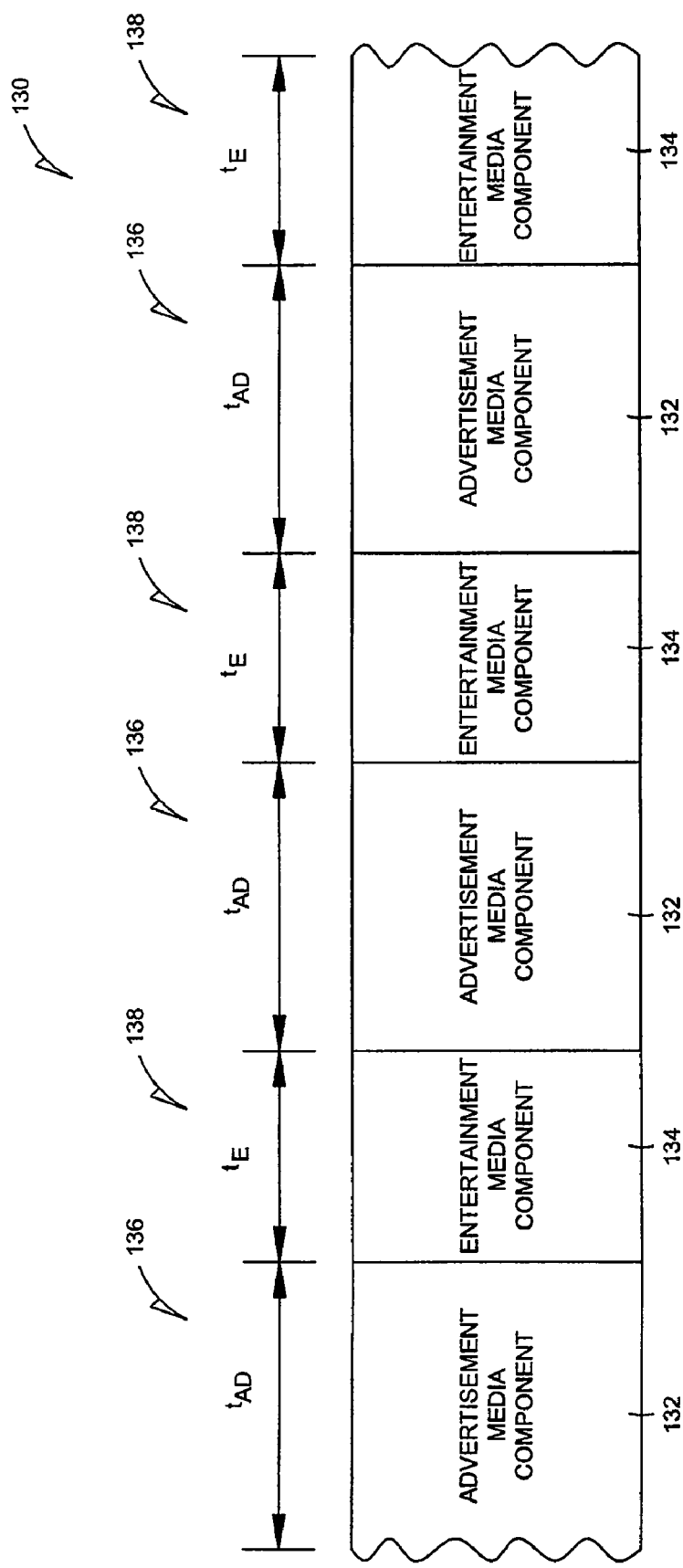
FIG. 3 shows a video stream, in accordance with an example embodiment, which may be generated by the media system of FIG. 2.

FIG. 3 shows an example video stream 130, in accordance with an example embodiment, which may be generated by the media system 100 and communicated via the communication network 54 to one or more of the interactive devices 52 (or any other display device). The video stream 130 is shown to include a plurality of advertisement media components 132 which may be sourced from the advertisement database 104, and a plurality of entertainment media components 134 which may be sourced from the entertainment database 106. In the example video stream 130, advertisement media components 132 and entertainment media components 134 are shown to alternate. However, it will be appreciated that any combination or arrangement of advertisement media components 132 and entertainment media components 134, in any sequence, may be provided in the video stream 130. For example, two or more advertisement media components 132 may follow sequentially, followed by a single entertainment media component, followed by any number of advertisement media components 132 thereafter. As described in more detail below, in an example embodiment, a user may define a ratio of advertisement media components 132 to entertainment media components 134 in a video stream provided to the viewer.

As shown in FIG. 3, in an example embodiment the advertisement media components 132 have a longer duration than entertainment media components 134. Accordingly, the advertising media components 132 have a duration $t_{AD}$ 136 that is longer than a duration $t_E$ 138 of the entertainment media components 134. It will, however, be appreciated that the duration $t_{AD}$ 136 of the advertisement media components 132 may vary from one media stream to another media stream and may also vary in duration in a particular video stream 130. Likewise, the duration $t_E$ 138 of the entertainment media components 134 may vary in a particular media stream or from one media stream to the next. In the example video stream 130 the advertisement media components 132 are shown merely by way of example to dominate the media content of the video stream 130.

Figure 4:
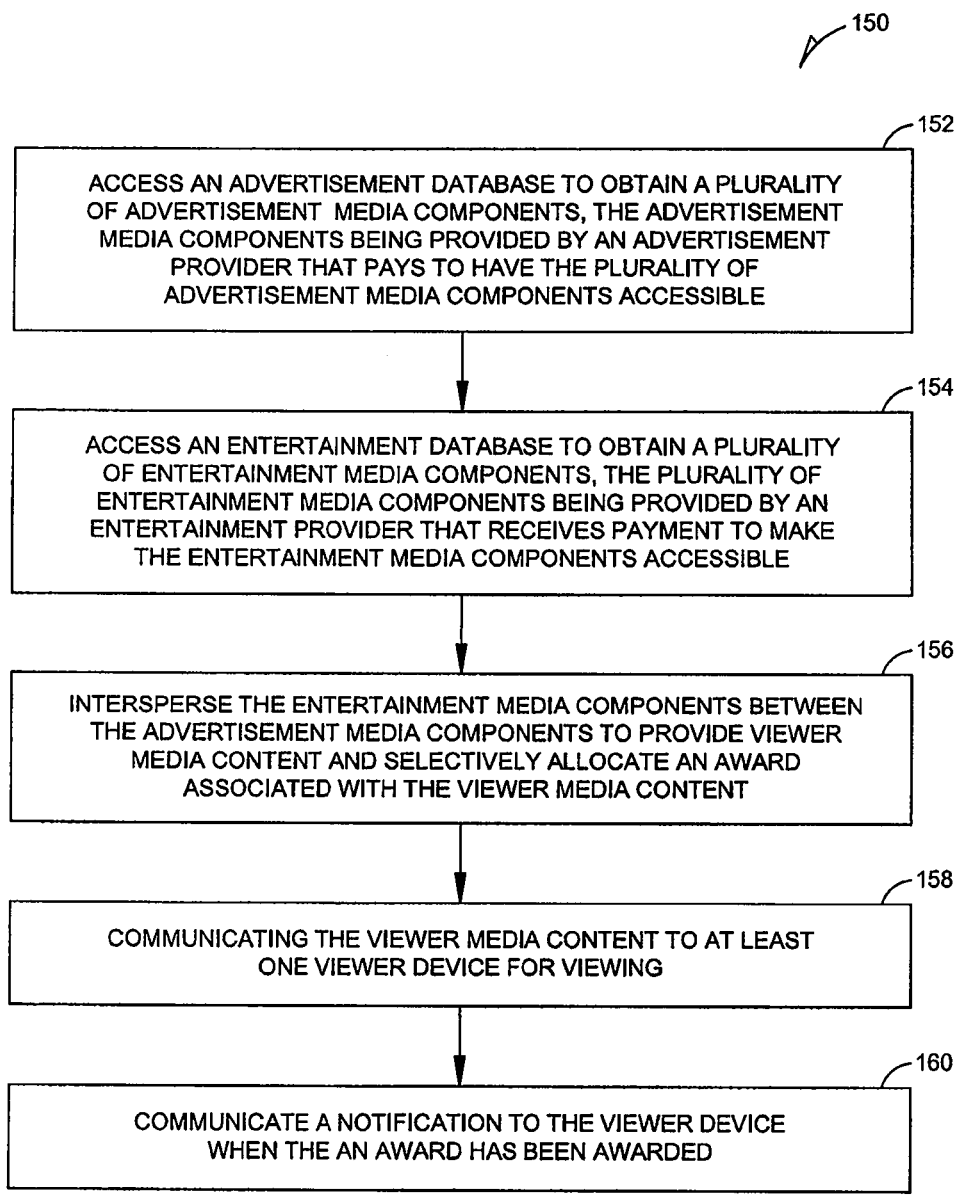
FIG. 4 shows a method, in accordance with an example embodiment, for providing advertisement and entertainment media components to a plurality of remote viewing devices.

FIG. 4 shows a method 150, in accordance with an example embodiment, for providing advertisement and entertainment media components to a plurality of remote viewing devices. The method 150 may be performed by the media system 100 and, accordingly, is described by way of example with reference thereto.

The method 150 may include accessing an advertisement database to obtain a plurality of advertisement media components wherein the advertisement media components are provided by an advertisement provider that pays to have the plurality of advertisement media components accessible (see block 152). Thereafter, an entertainment database may be accessed to obtain a plurality of entertainment media components (see block 154). The plurality of entertainment media components is provided by an entertainment provider that receives payment (or any other compensation) to make the entertainment media components accessible. In an example embodiment, the method 150 may access the advertisement database 104 to obtain advertisement media components 132 and access the entertainment database 106 to obtain entertainment media components 134.

As shown at block 156, the entertainment media components may be interspersed between the advertisement media components to provide viewer media content. An award may then be associated with the viewer media content and the viewer media content may then be communicated to the viewer device (see block 158). A notification may then be communicated to the viewer device when the award has been awarded (see block 160).

Figure 5:
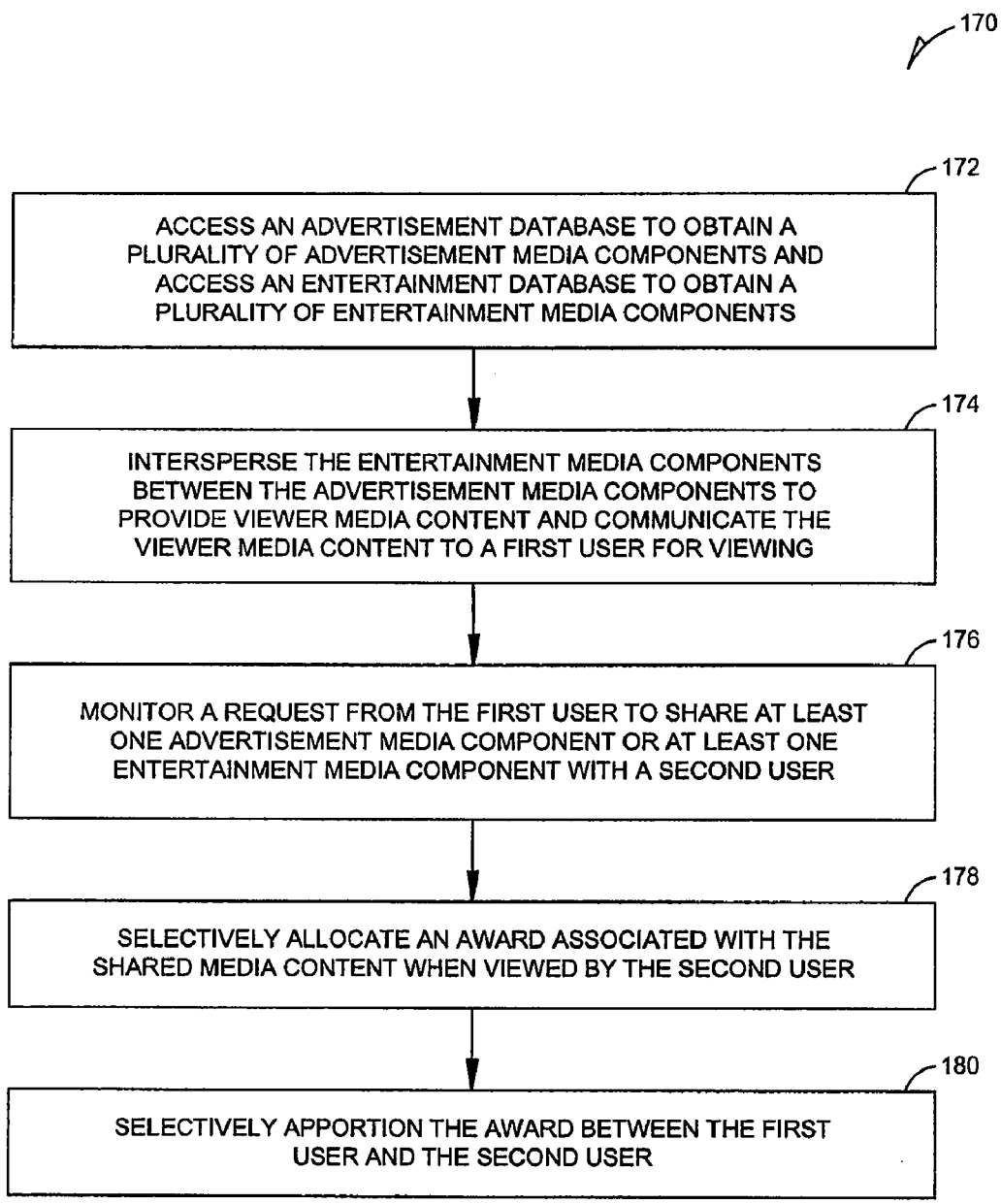
FIG. 5 shows a method, in accordance with an example embodiment, for sharing media content with at least one other user of a remote viewing device.

FIG. 5 shows a method 170, in accordance with an example embodiment, for sharing media content with at least one other user of a remote viewer device. The method 170 may be performed by the media system 100 and, accordingly, is described by way of example with reference thereto.

The method 170 may comprise accessing an advertisement database (e.g., the advertisement database 104) to obtain a plurality of advertisement media components and accessing an entertainment database (e.g., the entertainment database 106) to obtain a plurality of entertainment media components (see block 172). Thereafter, as shown at block 174, the entertainment media components may be interspersed between the advertisement media components to provide viewer media content that may then be communicated to a first user. The method 170 may then monitor a request from the first user to share at least one advertisement media component or art least one entertainment media component with a second user (see block 176). An award associated with the shared media content may selectively (e.g., based on an award algorithm) be allocated or awarded when the shared media content is viewed by the second user (see block 178). As shown at block 180, the award may be selectively apportioned between the first user and the second user.

Figure 6:
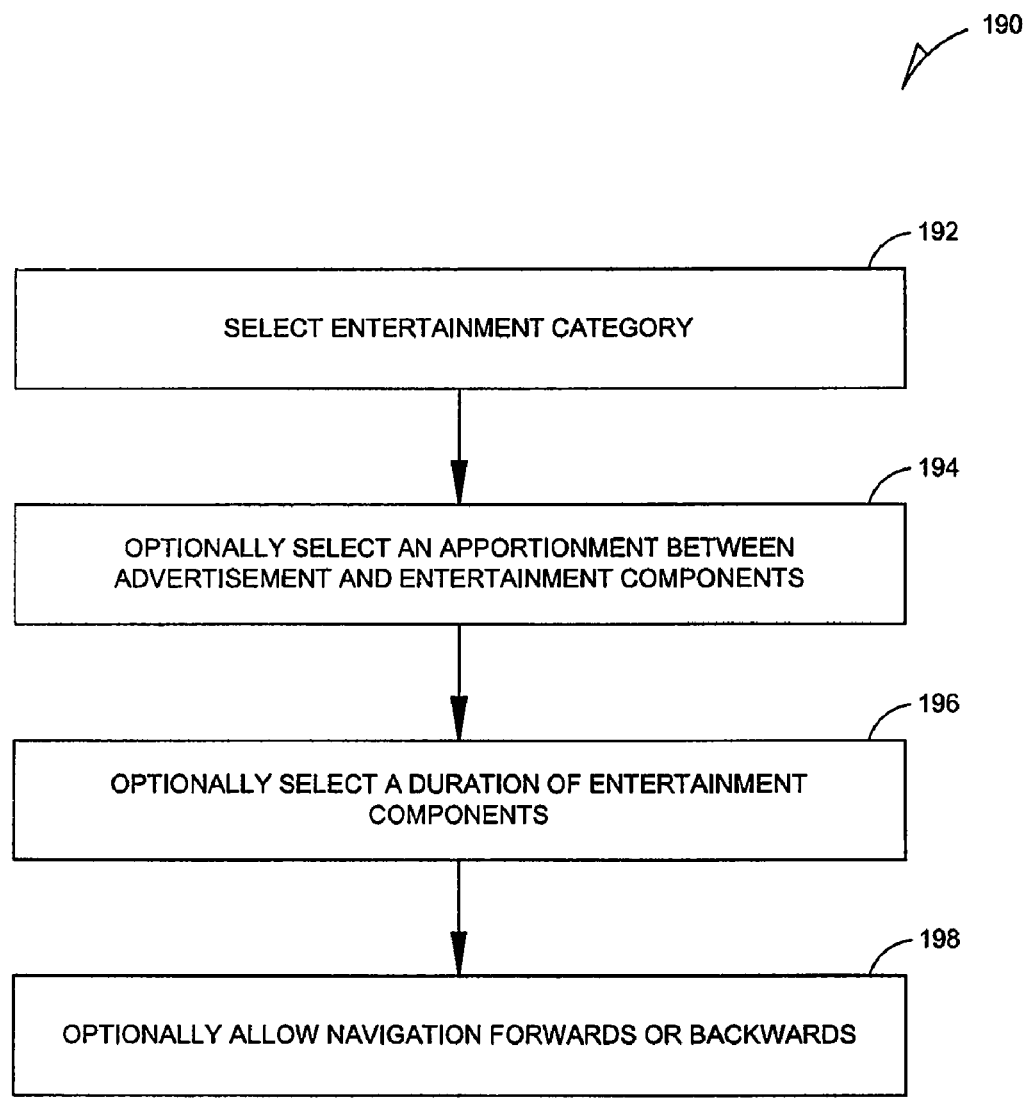
FIG. 6 shows a method, in accordance with an example embodiment, for configuring media content to be rendered to one or more interactive devices for viewing.

FIG. 6 shows a method 190, in accordance with an example embodiment, for configuring media content to be rendered to one or more interactive devices 52 for viewing. The method 190 may be performed by the media system 100 and, accordingly, is described by way of example with reference thereto.

As shown at block 192, a user may select an entertainment category for viewing. For example, an entertainment category may be best moments in sports, best kisses from movies, most expensive homes in the world, or any other entertainment media. Thereafter, as shown at block 194, the user may optionally select an apportionment between advertisement media components and entertainment media components. For example, in the video stream 130 shown in FIG. 3, the apportionment between advertisement media components 132 and the entertainment media components 134 is shown by way of example to be in the ratio of 1:1. It is, however, to be appreciated that any ratio may be selected by the user.

Further, the user may optionally select the duration of the entertainment media components. Referring again by way of example to FIG. 3, in the video stream 130 the duration $t_{AD}$ 136 of the advertisement media components 132 is shown to be longer than the duration or $t_E$ 138 of the entertainment media components 134. However, in an example embodiment, the user may select the duration $t_{AD}$ 136 of the advertisement media components 132 to be the same as the duration $t_E$ 138 of the entertainment media components 134, may select the duration $t_E$ 138 of the entertainment media components 134 to be longer than the duration $t_{AD}$ 136 of the advertisement media components 132, or any other desired ratio (see block 196).

Optionally, as shown at block 198, the user may navigate forward or backwards in media content being viewed using navigation buttons. Thus, in an example embodiment, the user may skip one or more of the advertisement media components 132 and/or the entertainment media components 134. In an example embodiment, limitations may be placed on how many advertisement media components 132 a user may skip during a given viewing session. Further, in an example embodiment, advertisement media components 132 that are skipped by the user may be presented again to the user during the same or a subsequent viewing session.

Figure 7:
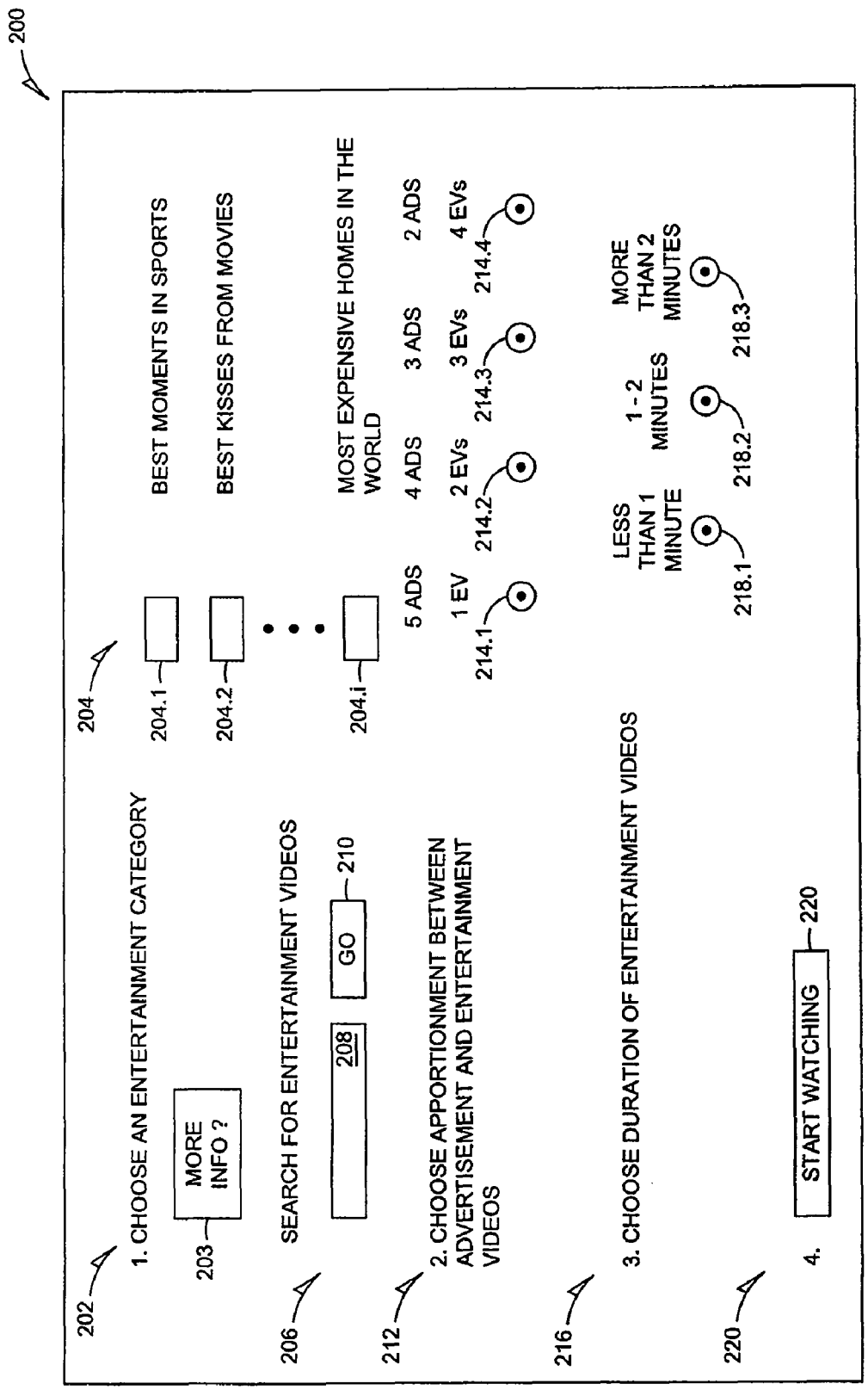
FIG. 7 shows an example graphical user interface (GUI), in accordance with an example embodiment, that may be generated by the media system of FIG. 2.

FIG. 7 shows an example graphical user interface (GUI) 200, in accordance with an example embodiment, that may be generated by the media system 100 (see FIG. 2). The media system 100 may then communicate or render the GUI 200 to one or more of the interactive devices 52 via the communication network 54. It should be appreciated that the systems, methods and devices described herein may be configured in a client-server relationship or a peer-to-peer network relationship, or any other configuration.

The GUI 200 is shown to include a display area 202 allowing a user to choose an entertainment category. Should a user require more information, the user may click a "MORE INFO?" button 203 that may provide further details or information. Adjacent to the display area 202 is a plurality of entertainment options 204.1-204.i. The user may select (e.g., click using a pointing device) one or more of the entertainment categories 204.1-204.i to select entertainment of interest to the user. This selection may then be communicated to the media system 100 and, in response thereto, the media system 100 may identify entertainment media components stored in the entertainment database 106 for communication to the user. In the example GUI 200, the entertainment category 204.1 is shown to correspond to best moments in sports, the entertainment category 204.2 is shown to correspond to best kisses from movies, and the entertainment category 204.i is shown to correspond to the most expensive homes in the world. In an example embodiment, when a user selects the entertainment category 204.1 associated video clips from the entertainment database 106 may be interspersed with advertisement media components from the advertisement database 104. In this way, a user may define or select the entertainment videos to be viewed. In an example embodiment, the media system 100 may record and process entertainment selections that a user has made. For example, the user management module 120 may record and process information about the entertainment selections and, optionally, advertisement media components may be selected from the advertisement database 108 based on this information.

In an example embodiment, the multiple entertainment options 204.1-204.i may be selected by a user and arranged in a "play list" of 50-100 categories. The selected entertainment categories 204 may appear in rotation. Thus, various display techniques may be used to allow the GUI 200 to facilitate selections of one or more entertainment categories from a substantial number of entertainment categories that may not readily be displayed on a relatively small display. In an example embodiment, the media system 100 may automatically select the entertainment media component for the user, for example, based on demographics and/or a user profile. In an example embodiment, a GUI may be provided (or the GUI 200 may be modified) to allow user to select advertising media components in a similar manner in which the user can select entertainment media components. Thus, an advertising media category may be provided that is similar to the entertainment category 204.

In an example embodiment, the GUI 200 includes a search facility 206 that allows a user to search for entertainment media components (e.g., entertainment videos). For example, the user may type key words into a search field 208 and thereafter select a "GO" button 210 to initiate the search. The media system 100 may then generate a GUI (e.g., new web page, pop-up or any other display) providing the search results.

The GUI 200 is also shown to include a display area 212 that allows a user to choose an apportionment between advertisements and entertainment videos. In the example GUI 200, four radio buttons 214.1-214.4 are provided to allow user selections. When the user selects radio button 214.1 the ratio of advertisements (ADS) to entertainment videos (EVs) provided to the user is 5:1, when the user selects the radio button 214.2 the ratio of advertisements to entertainment videos is 4:2, and so on. The GUI 200 may provide user selection to the entertainment/advertisement apportionment module 114 of the media system 100. The video stream 130 shown in FIG. 3 shows an example of a media stream generated by the media system 100 when the user has selected a 1:1 ratio (not shown in the GUI 200) of advertisement videos to entertainment videos.

In a display area 216 of the GUI 200, the user may choose the duration of the entertainment videos. For example, the GUI 200 includes radio buttons 218.1-218.3 to allow the user to select the duration of the entertainment videos. If the user selects the radio button 218.1, the length of each entertainment video may be less than one minute. Thus, the media system 100 and, in particular the entertainment/advertisement apportionment module 114 may receive user input from the GUI 200 to configure a video stream for communication to one or more of the interactive devices 52 comprising a plurality of advertisement media components interspersed with a plurality of entertainment media components. An example of such a video stream in shown in FIG. 3.

As shown in display area 220, once the user has defined or configured the video stream that he or she would like to receive, streaming of the video stream may be initiated by selecting a "START WATCHING" button 222. In response thereto, the media system 100 may generate a new GUI as described in more detail below.

Figure 8:
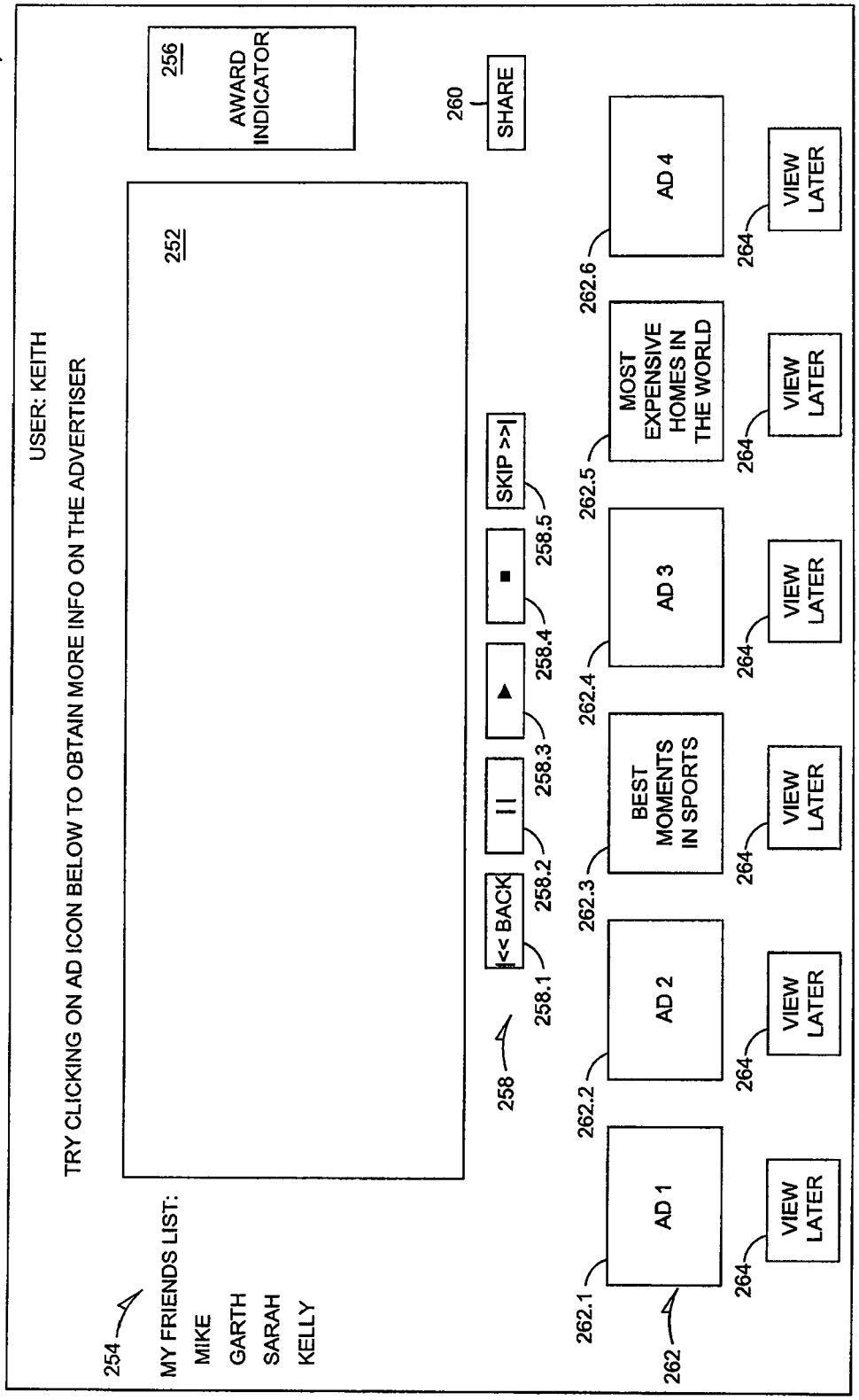
FIG. 8 shows a graphical user interface, in accordance with an example embodiment, for displaying media content to the user.

FIG. 8 shows a GUI 250, in accordance with an example embodiment, for displaying media content to the user. The GUI 250 may be generated by the media system 100 and rendered on the interactive devices 52 and, accordingly, is described by way of example with reference thereto.

The GUI 250 includes a display area 252, a display area 254 listing the user's friends forming part of his or her social network, an award indicator 256, navigation buttons 258, a share button 260, and a plurality of display zones 262 that display the advertisement entertainment media components rendered by the media system 100. Associated with each media component 262, is a "VIEW LATER" button 264 which, when selected by the user delays rendering of the media component until a later date or time. For example, when the user selects one or more of the "VIEW LATER" buttons 264, the media system 100 may log the selection (e.g. in the management database 180) and provide the media components that have been skipped at a later time or date to the user. The GUI 250 may display the name (e.g., Keith) of the user logged into the system 50.

As mentioned above, the ratio of advertisement media components to entertainment media components is not limited to a 1:1, 2:1, etc. and the entertainment media components may be interspersed at any point in a video stream between the advertisement media components. For example, in the GUI 250 the media system 100 is shown to have generated two advertisement media components 262.1 and 262.2 followed by a single entertainment video component 262.3, followed by an advertisement media component 262.4, followed by an entertainment media component 262.5, followed by an advertisement media component 262.6. In this example, the user is shown to have selected both "BEST MOMENTS IN SPORTS" and "MOST EXPENSIVE HOMES IN THE WORLD" categories using the GUI 200 (see FIG. 7).

The navigation buttons 258 are shown to include a "BACK" button 258.1 that allows a user to jump back to the beginning of an advertisement media component and/or an entertainment media component, a pause (II) button 258.2 that allows the user to pause rendering of the media components in the display area 252, a play (>) button 258.3 to initialize rendering of the media components in the display area 252 or resume rendering of the display of the media components after a pause, a stop button 258.4 and a "SKIP" button 258.5. The stop button 258.4 may stop viewing of media components and the SKIP button 258.5 allows a user to skip to the end of an advertisement and/or entertainment media component.

Circumstances may arise in which a user does not complete viewing a video stream that has been generated by the media system 100. In an example embodiment, the media system 100 may record a point in a media stream when a specific user terminates viewing of the media content. When the specific user later logs back onto the website, the user may be presented with media content starting from the point where viewing was terminated. Thus, in an example embodiment, where a user has selected one or more entertainment categories 204, and media content including the entertainment and advertisement media components has been generated by the media system 100, the media content may be delivered to the user in a plurality of viewing sessions. The user may, however, be provided with an option to resume viewing of the previous media content or select new media content (e.g., using the GUI 200 shown in FIG. 7).

Figure 9:
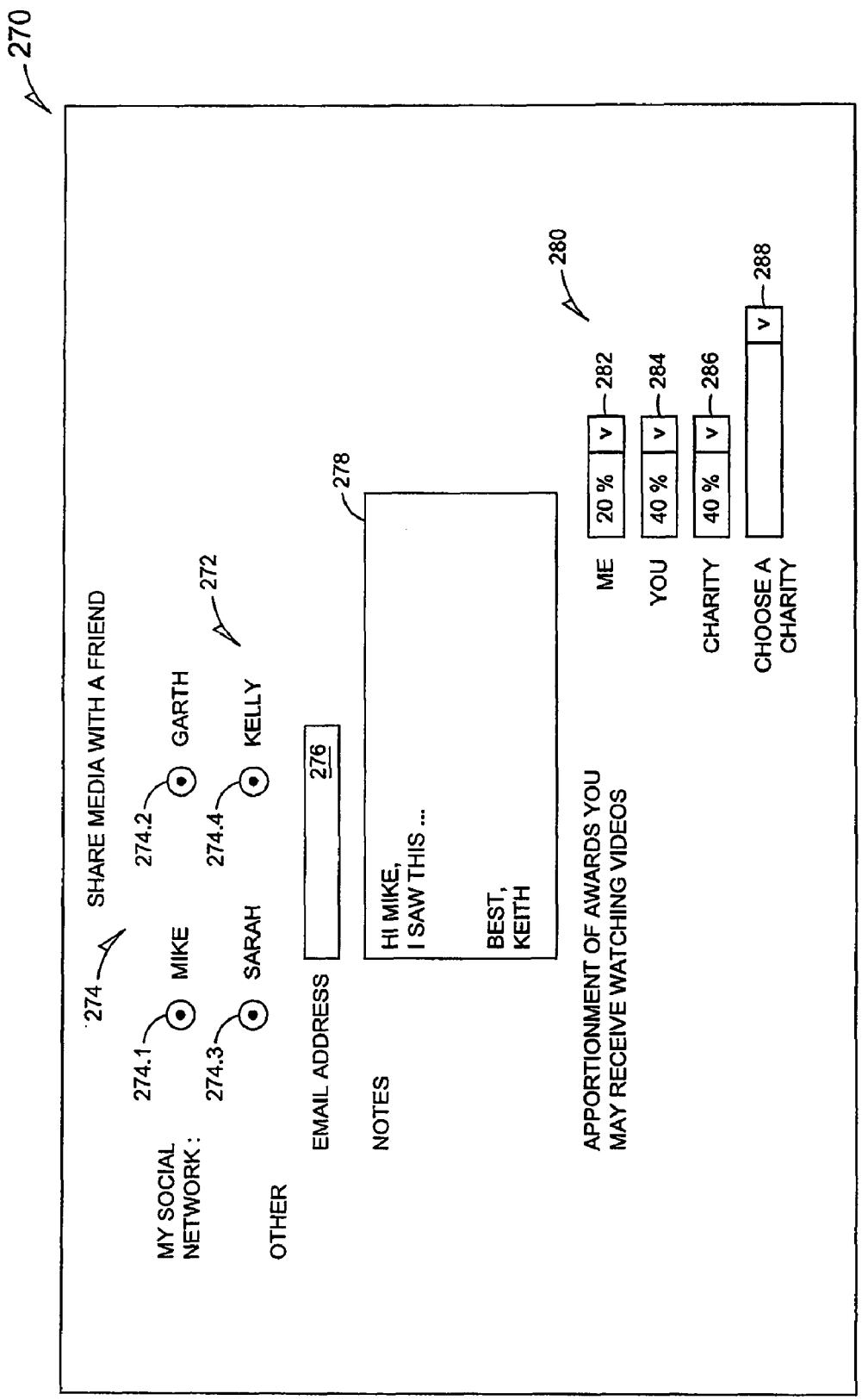
FIG. 9 shows a graphical user interface, in accordance with an example embodiment, for sharing advertisement media components and/or entertainment media components with another user.

As mentioned above, the user may be randomly or otherwise rewarded for viewing the video streams generated by the media system 100. For example, the award allocation module 116 of the media system 100 may randomly award an entry into a sweepstakes where the user may win a prize. In addition or instead, the award allocation module 116 may award other awards to the user for viewing the video stream. In an example embodiment, the user may share or communicate with another user in his or her social network and recommend viewing of the media content (e.g., the advertisement and/or entertainment media components). In the GUI 250, this may be accomplished by the selecting the "SHARE" button 260 which, in turn, may result in the media system 100 providing a further user interface allowing a user to select one or more users in his or her social network to share the media content with. An example of such a user interface is shown in FIG. 9.

Reference 270 generally indicates a GUI, in accordance with an example embodiment, for sharing advertisement and/or entertainment media components with another user. The GUI 270 is shown to include a list of members of a user's social network ("MY SOCIAL NETWORK") 272 including a radio button 274 associated with each member of the user's social network. For example, a radio button 274.1 is associated with friend "MIKE", a radio button 274.2 is associated with friend "GARTH", a radio 274.3 is associated with "SARAH", and a radio button 274.4 is associated with "KELLY". The user may then select one or more of his friends using the radio buttons 274 to share the media content with his friends.

If the user decides to share the media content with one or more other users who are not currently in the user's friends list, an email addresses may be provided in an email address field 276. A "NOTES" field 278 is provided by the GUI 270 to allow the user to write a note to the one or more persons he wishes to share the media content with. In an example embodiment, the NOTES field 278 may include a message template that the user may then edit and modify to facilitate communicating with friends in his friends list.

In an example embodiment, when the user shares the advertisement and/or entertainment media components with one or more friends in his social network, any award that the friend may receive for watching the media components may be apportioned. For example, as shown in display area 280, the awards may be apportioned between the user using a dropdown menu 282, the friend with which the media is being shared using a dropdown menu 284 and, optionally, a charity using a dropdown menu 286. In an example embodiment, a charity may be selected using a charity dropdown menu 288. In the GUI 270 20% of any award that may be awarded is credited to the user ("ME"), 40% is credited to the person who the user has shared the media content with ("YOU"), and 40% is credited to a charity ("CHARITY"). The aforementioned percentages may thus define apportionment data used to apportion any awards that might be won. The apportionment data may be stored in the management database 108 and processed by the user management module 120, the award processing module, and/or any other module of the media system 100.

Figure 10:
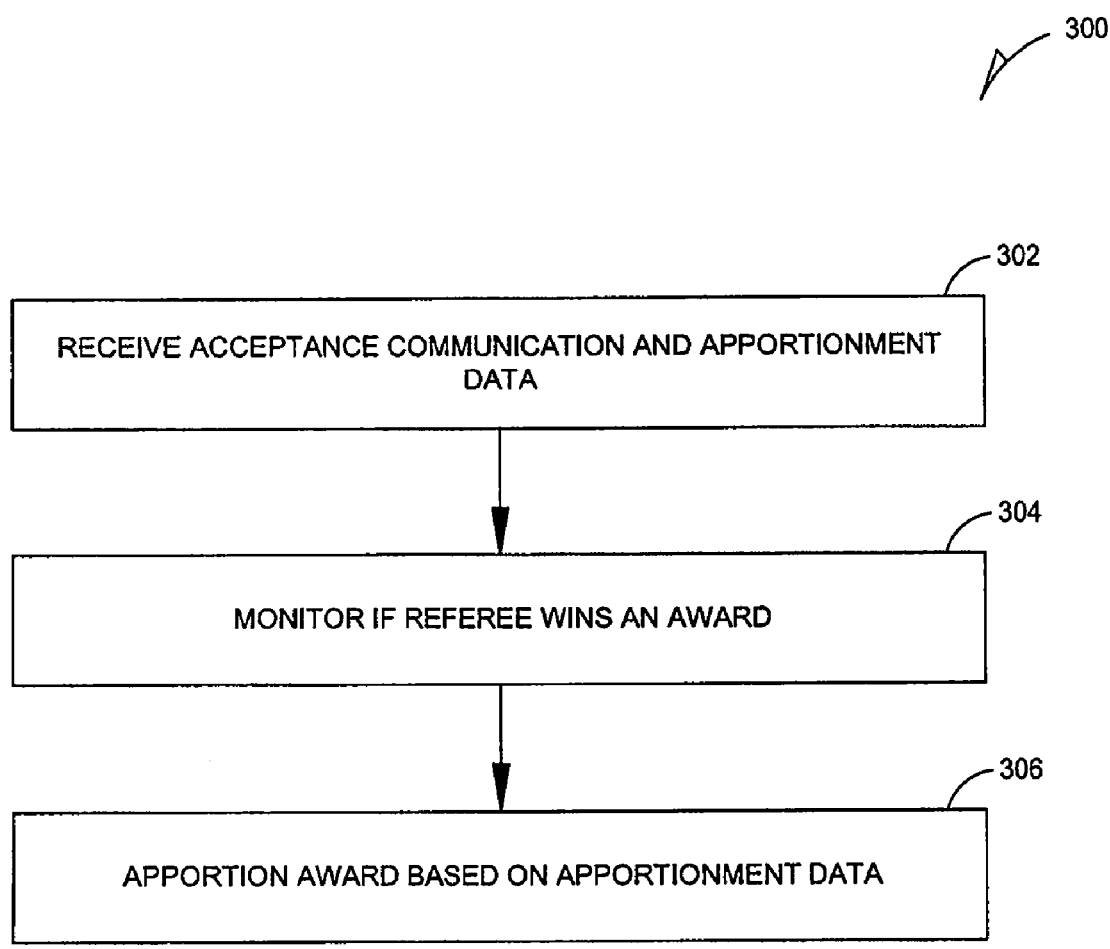
FIG. 10 shows a method, in accordance with an example embodiment, for apportioning rewards between two or more users.

FIG. 10 shows a method 300, in accordance with an example embodiment, for apportioning rewards between two or more users. The method 300 may use the GUI 270 and, accordingly, is described by way of example with reference thereto.

As shown at block 302, the method 300 may receive an acceptance communication and apportionment data and, for example, store the data in the management database 108. For example, this data may correspond to the apportionment of the rewards as shown in the apportionment display area 280 (see FIG. 9). Thereafter, the method 300 may monitor if a referee (a user with which another user has shared media content) wins an award as shown at block 304. If the referee wins an award, the award may then be apportioned (see block 306) based on the apportionment data (e.g., stored in the management database 108).

FIG. 11 shows a GUI 310, in accordance with an example embodiment, for presenting a share media invite to another user or referee. The GUI 310 includes a display area 312 identifying a sender of the invite ("KEITH") and a display area 314 to display a note from the user sending the media content (see also display area 278 in FIG. 9). In a display area 316, the particular apportionment of awards that the sending user (KEITH) has selected is displayed to the referee ("MIKE"). If the referee agrees to the apportionment of the awards, he may select an "ACCEPT" button 318 whereupon the media system 100 updates the management database 108 to store the apportionment data. However, in an example embodiment, the referee may negotiate a different apportionment of any awards that he or she might win. For example, the GUI 310 includes a dropdown menu 320 to select a percentage that the referee (MIKE) gets if an award is won, a dropdown menu 322 to adjust a portion that the referrer (KEITH) may get, and a dropdown menu 324 which may be awarded to a charity. It should be appreciated that any value between 0% and 100% may be apportioned to any one or more of the potential recipients but that the sum of apportionments of the award add up to 100%. In order to communicate a new proposal to the user sharing the media, a "NEW PROPOSAL" button 326 may be activated. In an example embodiment, the user may not be allowed to send a 50/50 proposal to a non-registered user.

It will be appreciated that multiple iterations or communications between the user sharing the media content and the recipient of the share media invite may take place before an agreement is reached as to the proportions in which any awards are to be shared. When media content is shared between multiple share media invite recipients, different sharing arrangements may be proposed or negotiated between the user sending the invite and each recipient of an invite.

Figure 12A:
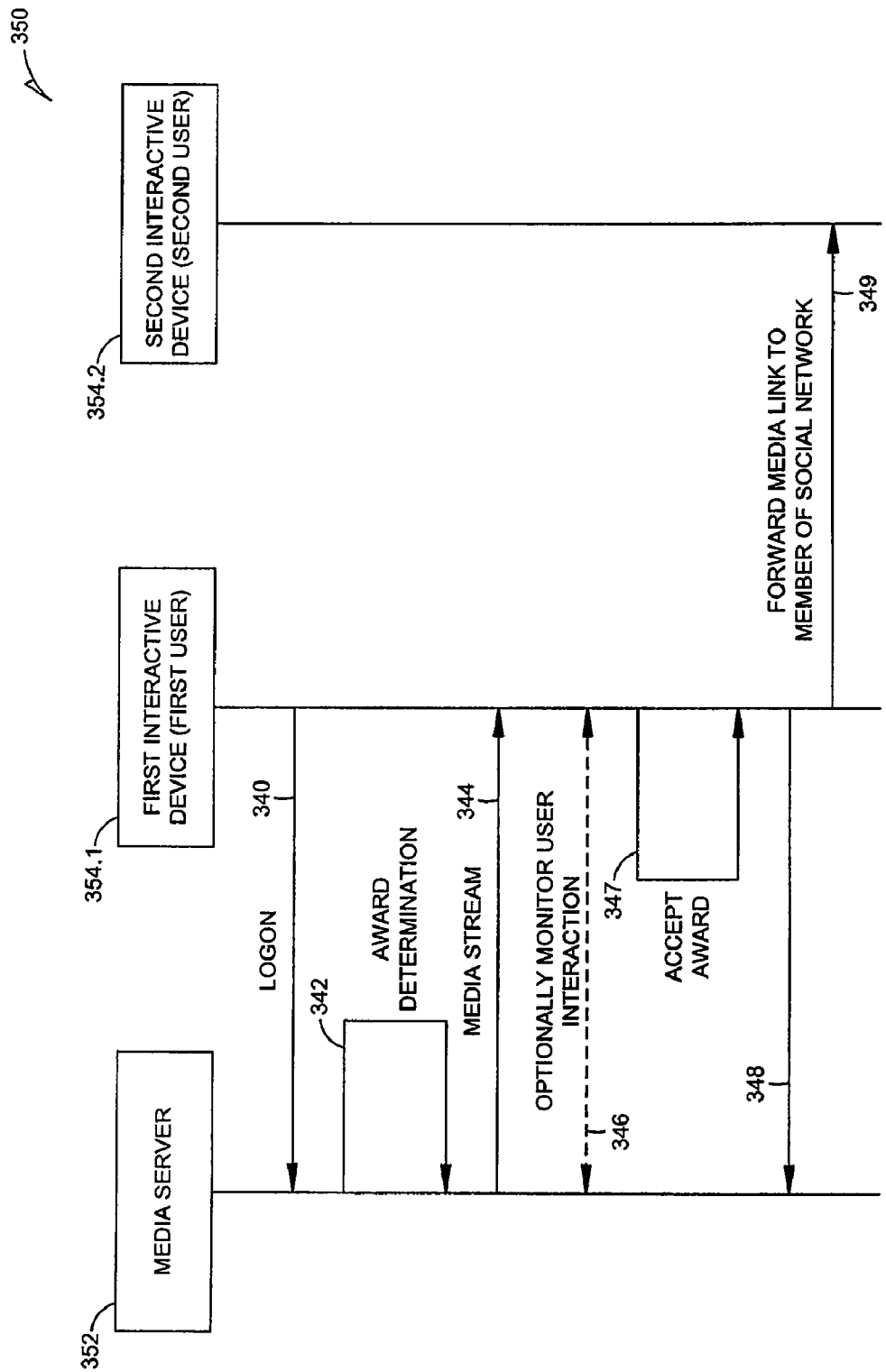
FIGS. 12A and 12B show an interaction diagram, in accordance with an example embodiment, of communications when the system of FIG. 1 is deployed in client-server architecture.
Figure 12B:
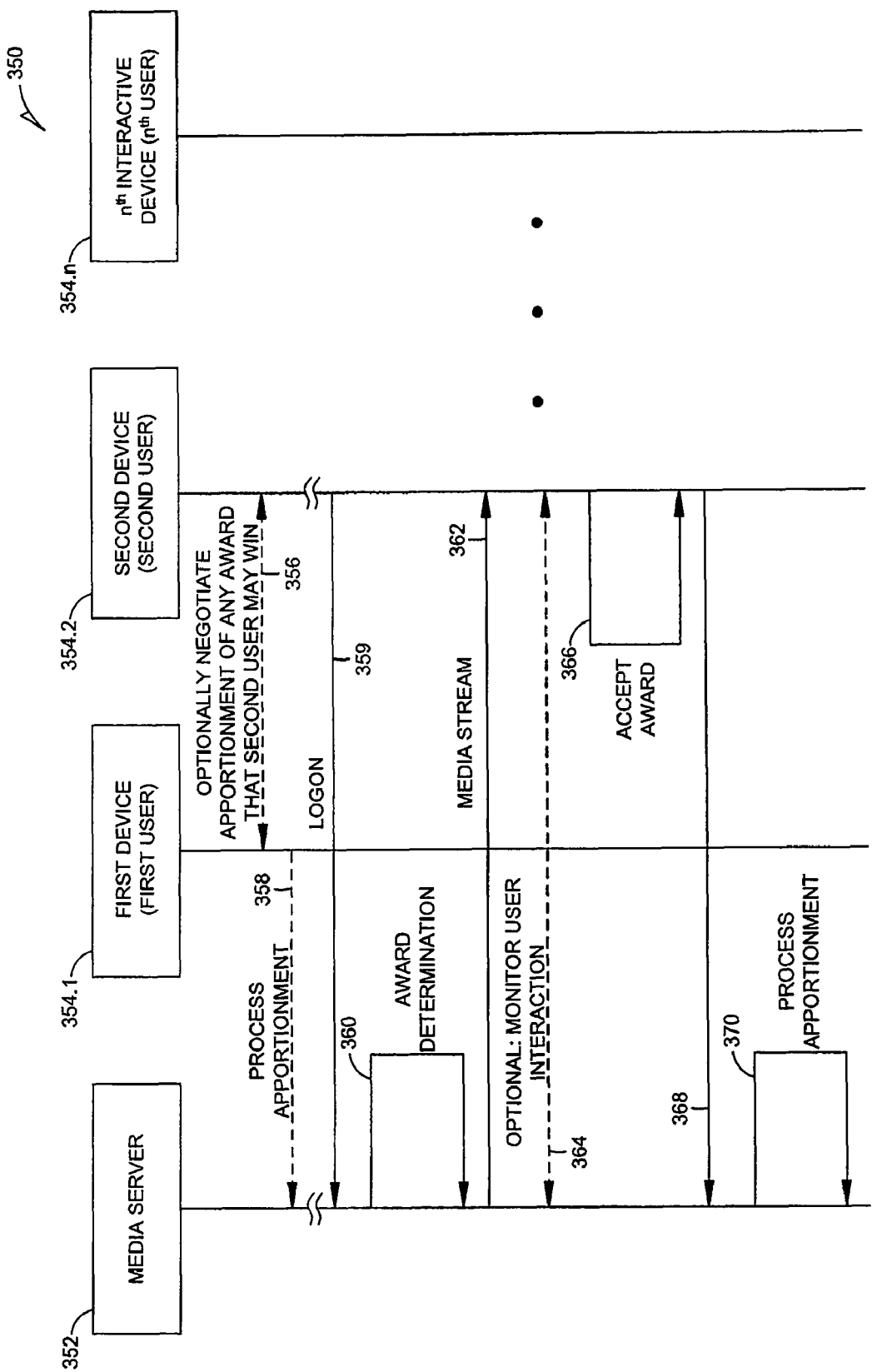

FIGS. 12A and 12B show an interaction diagram 350, in accordance with an example embodiment, of communications when the system 50 is deployed in client-server architecture. The interaction diagram 350 is shown to include interactions between a media server 352 (e.g., corresponding to the media system 100) and a plurality of interactive devices 354.1-354.n (e.g., corresponding to the interactive devices 52 of FIG. 1). Communications in the interaction diagram 350 may correspond to communications generated by the method 300 and, accordingly are described by way of example with reference thereto.

FIG. 12A shows example interactions between the media server 352 and a first interactive device 354.1 associated with a first user. As shown by communication 340, the first user may log on to the media server 352 using the first interactive device 354.1. For example, the media server 352 may include a user management module substantially similar to the user management module 120 (see FIG. 2) that manages user logons, user account details, or the like and accesses and updates data in the management database 108. Thereafter, as shown at operation 342, the media server 352 may make an award determination for a viewing session. For example, the media server 352 may include an awards allocation module substantially similar to the awards allocation module 116 shown in FIG. 2. Thereafter, as shown by communication 344, media content may be communicated via a communication network (e.g., the communication network 54 shown in FIG. 1) to the first interactive device 354.1. As shown by communication 346, the media server 352 may optionally monitor user interaction using, for example, the GUI 250 shown in FIG. 8.

If an award is awarded to the viewer of the media content, and the viewer accepts the award (see operation 347), such acceptance may then be communicated from the first interactive device 354.1 to the media server 352 as shown by communication 348. If the first user selects to share the media content with one or more other users, an appropriate communication 349 (e.g., an email message, an instant message (IM) or the like) may be forwarded to a second user a second interactive device 354.2. The communication 349 may be forwarded directly to the second interactive device 354.2 (e.g., via the Internet and not via the media server 352) or forwarded indirectly to the second interactive device 354.2 via the media server 352. In an example embodiment, the media server may then update management data in a management database. For example the media sever 352 may record the fact that the first user forwarded the media content to the second user. In an example embodiment, the media content is shared by sending a hyperlink so that the transfer of large media files in the communication can be avoided.

As described by way of example above, any award that a recipient of shared media may receive may optionally be negotiated. Single or multiple communications may take place between the first user and the second user until an agreement on an apportionment of any awards received by the second user is reached (see communication 356). In an example embodiment, the GUI 270 (see FIG. 9) and the GUI 310 (see FIG. 11) may be used to negotiate the apportionment of any awards. As shown by communication 358, once the users have agreed to an apportionment of the awards, the media server 352 may be updated to store the apportionment data. For example, the media server 352 may update a management database similar to the management database 108 shown in FIG. 2.

The second user may log on (see communication 359) to the media server 352 and proceed to view the shared media content using, for example, an interface such as the GUI 250 (see FIG. 8). The media server 352 may then, as shown by operation 360 make an award determination based on an award algorithm. The award determination may include providing one or more awards to the second user viewing the shared media content. For example, the media server 352 may include an award allocation module substantially similar to the award allocation module 116 shown in FIG. 2. In the example embodiment shown in FIG. 12B, the award determination is shown to be determined by the media server 352 prior to the second user receiving the media content. Accordingly, in an example embodiment, the media stream is communicated to the second user after the award determination has been made (see communication 362). In an example embodiment, user interaction with the second interactive device 354.2 (e.g., using the GUI 250) is monitored during viewing of the shared media content as shown by communication 364.

If the second user receives an award, an option may be provided to the second user to select or reject the award as shown by operation 366. If the second user accepts the award, the acceptance is communicated to the media server 352 as shown by communication 368. The media server 352 may then process the apportionment of the award by operation 370 based on the negotiated apportionment (see communications 356). For example, the media server 352 may include an award processing module similar to the award processing module 118 shown in FIG. 2. During processing of the award, data in the management database 108 may be updated to reflect new or updated balances/credits.

As mentioned above, awards may be monetary or otherwise. For example, a user viewing a media stream may receive one or more instant prizes predetermined by the media system 100 (e.g., using the award allocation module 116) that are awarded after the user has viewed an advertisement media component. Additionally or instead, the user viewing the advertisement media components may be entered into a sweepstakes that may be held at various preset times (e.g., once a week, month, etc. . . . ). However, the user may not necessarily receive an award after viewing an advertisement and/or entertainment media component.

In an example embodiment, viewing of advertisement media components that are streamed to a viewer device (e.g., one or more of the interactive devices 52 and 352) may be monitored. For example, the media system 100 may require a user to provide a user input (e.g., a mouse click when the interactive device is a computer) to confirm the user's attention to the advertisement media component. In an example embodiment, the media system 100 is configured to require the user to provide a user input during different intervals while watching an advertisement media component (e.g., at about 5 seconds, 10 seconds, the end of the advertisement media component, or the like). An on screen notification may be provided to prompt the user to provide the user input or acknowledgement.

In an example embodiment, one or more advertisement media components may include subtle messages or markings within an advertisement. A viewer paying careful attention to the advertisement, and thus noticing the message, may then respond to the message and receive an award. For example, the text "win" may be provided on a bumper of a BMW motor vehicle shown in an advertisement and an observant user may click on the text and claim an award.

A user may be provided with an option to request more information from an advertiser providing a particular advertisement media component. In an example embodiment, the user may be directed to an advertiser's website or an informational website hosted by the system 50. These websites may then provide additional information on a product or service, and possibly win a prize while seeking this additional information.

In an example embodiment, links to an online store or virtual shopping center are provided where advertisers offer special discounts available specifically to users of the system 50. Advertisers and/or the system 50 may match some awards by giving a percentage of the award to a user, multiple users sharing content, one or more charities, or the like.

In an example embodiment the media system 100 includes a review or feedback module to receive and process feedback from a user viewing the media content. For example, in an example embodiment the media system 100 generates a GUI that allows a user to volunteer as a member of a focus group where advertisers ask questions and/or seek comments on an advertisement, product, and/or service. Awards specifically for participating in a feedback session may be allocated.

In an example embodiment, in order to receive an award a user is required to register with the media system 100. Thus, the user management module 120 may be configured to generate appropriate GUIs to allow user registration and manage user data and, optionally, user profile information in the management database 108. User data that may be obtained from a user during registration may include name, email, age and/or gender.

The award allocation module 116 may include one or more algorithms for allocating awards to users. Data used to generate the award and its value may be stored in the management database 108. In an example embodiment, the odds of receiving an award remain set to be no more than one tenth of one percent chance of winning for viewing a set period of time (e.g., 3 minutes). Additionally or instead, the odds of receiving an award may remain set for a predetermined number of logon instances.

Awards include fantasy prizes (e.g., play tennis with Andre Agassi), frequent flyer miles, win a part in a Hollywood movie (e.g., the next Angelina Jolie movie), be a guest host on a television program (e.g., American Idol) to name but a few.

In an example embodiment, an award may be allocated to a viewing session irrespective if a user skips and advertisement media component (e.g., see navigation buttons 258 shown in FIG. 8). Thus, the odds of a user winning an award may not change if the user skips one or more advertisement media components. However, an award may be allocated to a specific advertisement media component and the user may only receive the award if the user views (e.g., in its entirety) the specific advertisement media component.

In an example embodiment, the media system 100 may publish (e.g., via a website hosting the media system 100) awards that have been won by users. For example, the website may provide information of a total monetary value awarded to multiple users during a predetermined time period (e.g., daily, weekly, monthly). Details of individual awards may also be provided. Each user may have a customized "home page" that displays their awards and any other personalized information.

In an example embodiment, the system 100 is configured to provide a user interface to enable one user to upload and send media (e.g., audio, photographs and/or personalized video) to another user (e.g., another user in his or her social network). The media system 100 may generate a web interface that allows the recipient of the media to download the media or reject the media.

The media system 100 may limit the number of advertisement media components shared with any one or more other users. For example, user management module 120 may analyze incoming invites to media share and filter out invites from different users (or the same user) that relate to the same (or similar) media content that the user has previous received and/or viewed. The media system 100 may send a notification to the sender of the invite informing the sender that the recipient has already viewed the media content. In an example embodiment, the media system 100 provides a user interface that allows a recipient of shared media to block further shared media invites from one or more users.

In an example embodiment, a registered user (or member) may send an advertisement media component to a non-registered user (non-member) if they apportion the ward in such a manner that they do not receive any portion of the reward. For example, the user sharing the media content may apportion the award in such a manner so that 50% goes to a charity and 50% goes to the user with which the award is shared. In an example embodiment, a registered user (member) is precluded from receiving shared media from a non-registered user (non-member).

The media system 100 may be configured so that a user sending an advertisement media component may select to receive nothing. In these example circumstances, the award may be apportioned so that 50% goes to a charity and 50% goes to the recipient. If the recipient wins an award, the user sending the shared media invite may be awarded a "fantasy prize". Example of fantasy prizes includes an opportunity to play tennis with Andre Agassi.

Corporations and corporate executives may be provided an advertising opportunity by the media system 100. For example, corporation names may be listed in a charity section where various charities are listed. In an example embodiment, the corporations will have a minimum amount that they will have to contribute to a charity to be listed.

In an example embodiment, the media system 100 facilitates a feedback process where recipients of awards are able to post comments on what the award (large or small) meant to them. For example, the recipient of the award may post that they used a monetary award to pay a portion of their mortgage, credit card bill, other loans, that they contributed to a persons college fund, helped a sick friend, etc.

Figure 13:
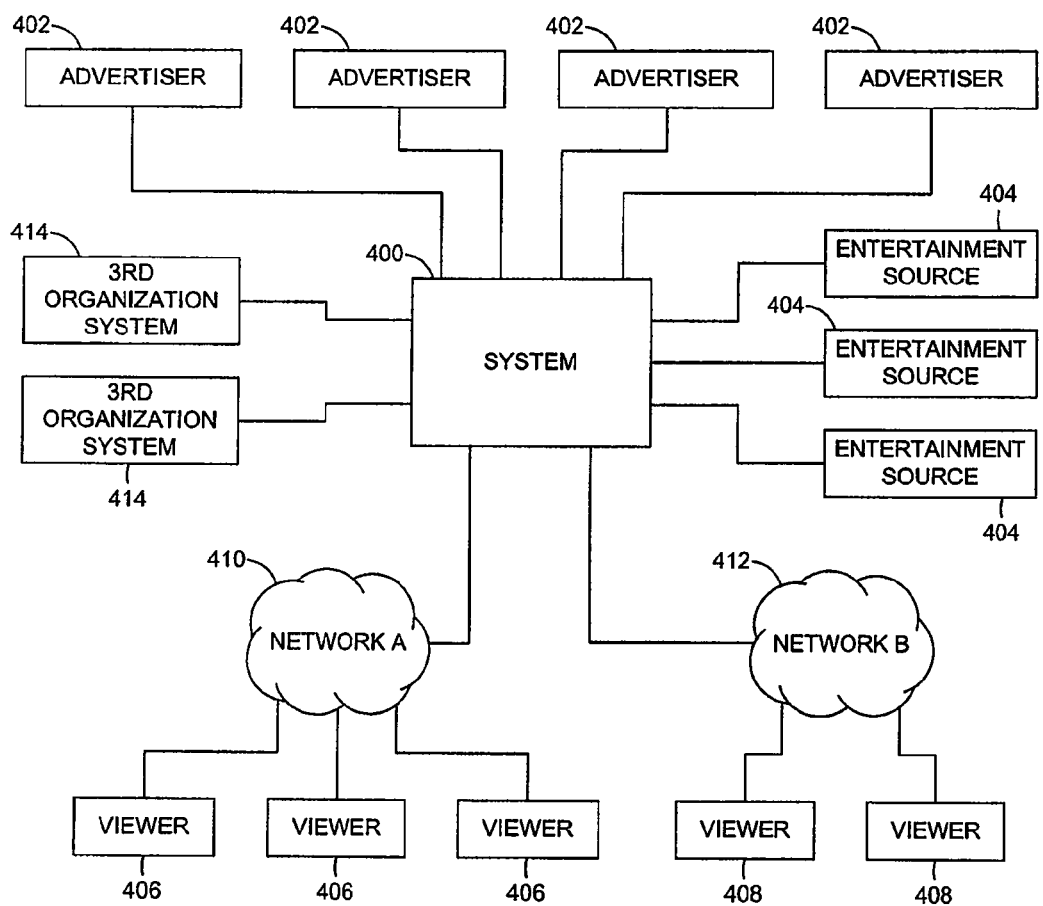
FIG. 13 shows a schematic block diagram of a further system, in accordance with an example embodiment, to present media content to a plurality of viewer devices.

FIG. 13 is a schematic block diagram of a further system 400, in accordance with an example embodiment, to present media content to a plurality of viewer devices. In an example embodiment, the viewer devices may substantially resemble the interactive devices 52 and 354. The system 400 may electronically provide a visual presentation that facilitates a playing of at least one from a plurality of advertisement video works or a sequence of static images during a communication session with a person via viewer devices 406 and 408. The viewer devices 406 and 408 may comprise, in an example embodiment, an electronic communication input, an electronic communication output and a computer coupled to the electronic communication input and to the electronic communication output, and configured to perform the electronic processes of the example embodiments.

The visual presentation facilitated by the computer system 400 may be provided electronically via one or more electronic networks 410 and 412. The visual presentation may be provided by hosting one or more customized pages on a website or other Internet communication, via a telephone connection to a screen on the telephone, via a television network to a television, or via interactive television, to name but a few. It should be noted that any electronic communication network may be used to provide the visual presentation to the viewer devices 406 and 408. The visual presentation may be live, prerecorded, time shifted, or the like.

The advertisement video works or sequences of static images (e.g., advertisement media components 132 shown by way of example in FIG. 3) may be obtained via electronic links with one or more advertisers 402. Alternatively, these advertisement video works or a sequence of static images may be contained on electronic media and mailed or otherwise provided manually to the system 400. For example, the system 400 may comprise several databases (e.g., the databases 102 shown by way of example in FIG. 2).

Additionally, entertainment sessions, such as entertainment videos or live feeds, or a sequence of static images (e.g., see entertainment media components 134 shown by way of example in FIG. 3) may be obtained via electronic links with one or more entertainment sources 404 and may be interspersed or played at the same time as the advertisement video works or a sequence of static images. Such entertainment sessions may be prerecorded videos, or in an example embodiment, could be live feeds from the entertainment sources 404. Alternatively, these advertisement video works or a sequence of static images may be contained on electronic media and mailed or otherwise provided manually to the system 400. Entertainment videos may comprise movie or television clips, access to fantasy sports or other fantasy games, live or recorded sports games, to name but a few. An example of an entertainment session that may be performed at the same time as an advertising session comprises banner advertisements displayed on a screen of a viewer device at the same time as the display of the entertainment session. These banner advertisements may be static, and would be viewed static image by static image, or could be a moving picture video work (e.g., an Adobe Flash™ movie).

Additionally, the system 400 may receive membership lists, member data, and live visual feeds from one or more third party organizations 414. By way of example, such third party organizations may comprise bridge clubs, sports clubs, chess clubs, garden clubs, travel clubs, fantasy sports or game clubs, to name but a few. Live feeds or prerecorded videos from such third party organizations may be interspersed with or played at the same time as the media content, but in a different segment of the screen. In an example embodiment, the user management module 120 may manage the membership list and membership data may be stored in the management database 108.

Figure 14:
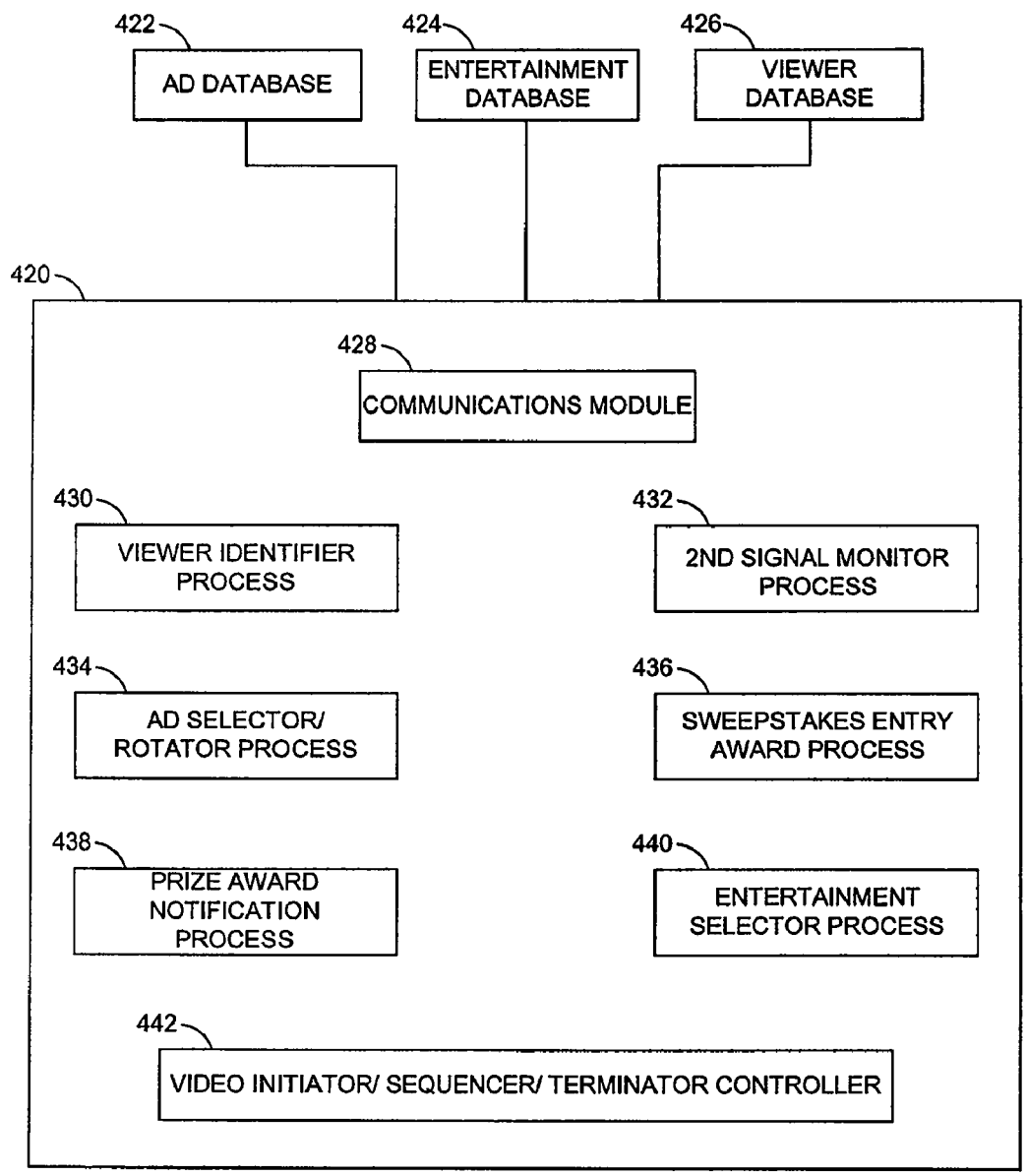
FIG. 14 shows a schematic block diagram of example modules of a computerized method, in accordance with an example embodiment, for presenting media content to a plurality of viewer devices.

FIG. 14 shows a schematic block diagram of example processes of a computerized method, in accordance with an example embodiment, for presenting media content to a plurality of viewer devices. The example processes may be used to implement any one or more of the example embodiments described herein and may be executed by one or more computers 420.

The computer 420 is shown to include a communications module 428 to communicate with an advertisement database 422 (which may be substantially similar to the advertisement database 104), an entertainment database 424 (which may be substantially similar to the entertainment database 1064), and a viewer database 426 (which may be substantially similar to the management database 108). Further, the computer 420 is shown by way of example to execute a viewer identifier process 430, a second signal monitor process 432, an advertisement selector/rotator process 434, a sweepstakes entry award process 436, a prize award notification process 438, an entertainment selector process 440, and a video initiator/sequencer/terminator controller 442. These various processes may perform the methods, or parts of the methods described herein.

The viewer identifier process 430 may identify a viewer based on at least one criterion, such as an IP address. This viewer identifier process 430 may be initiated by a user log-on to a website hosted by the computer 420 or may be initiated by the user sending a signal indicating that the he or she wishes to view an advertisement media component (e.g., described below in block 504 in the method 500 shown in FIG. 16). This process may include the use of links to other servers to obtain viewer identification data. The viewer identifier process 430 may include a viewer registration module for obtaining data about the viewer and, for example, form part of the user management module 120 shown in FIG. 2.

The second signal monitor process 432 may receive and process one or more second signals from a given user. The processing may comprise counting the received second signals as the advertisement media component is played or determining if a second signal was received contemporaneous with the end of the advertisement media component (e.g., described below in block 508 in the method 500).

The advertisement selector/rotator process 434 may select advertisement media components which are then communicated to the interactive device 52 for viewing by the user viewer based on one or more criteria (e.g., criteria mentioned herein). The sweepstakes entry award process 436 may award one or more sweepstakes entries based on the one or more first criteria.

The prize award notification process 438 may provide a notification of the award of a prize based on a second criterion. This prize award notification process 438 may also be used to facilitate the actual award of the prize. Such facilitation may comprise sending an electronic communication to initiate the transfer of money to a designated account, sending an electronic communication to an advertising company to send or make available a prize, to name but a few. In an example embodiment prize award notification process 438 may be performed by the award processing module 118.

The entertainment session selector process 440 may select one or more entertainment media components to be interspersed with, or played at the same time as the advertisement media components. This selector process 440 may be based on one or more criteria, such as the timing of the communication session, the number of the communication sessions within a given period, the demographics of the user, or a received signal from the viewer representing a choice or preference for a particular entertainment category to name but a few.

The example processes and methods described herein may be implemented on a computer system, which can be, for example, a mainframe computer, minicomputer, workstation, personal computer, a web computer, a thin client, and/or an Internet appliance.

Figure 15:
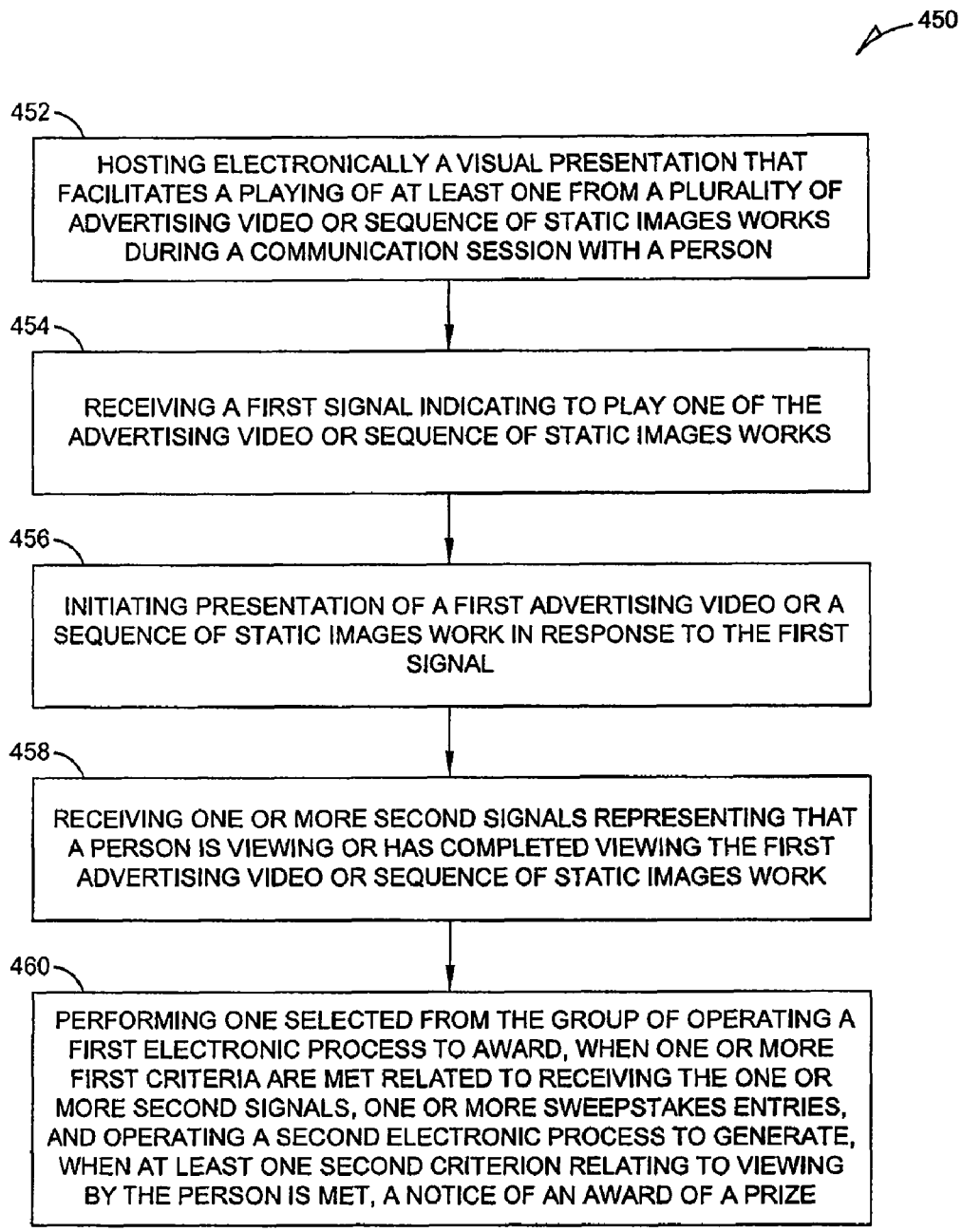
FIG. 15 shows a flowchart of a computerized method, in accordance with an example embodiment, for presenting media content to a plurality of viewer devices and processing awards associated with the media content.

FIG. 15 shows a flowchart of a computerized method 450, in accordance with an example embodiment, for presenting media content to a plurality of viewer devices and processing awards associated with the media content. It will be noted that the various operations shown in the method 450 correspond to at least some of the operations shown in the interaction diagram 350 (see FIGS. 12A and 12B).

As shown at block 452, the method 452 may comprise hosting electronically a visual representation that facilitates playing media content (e.g., at least one from a plurality of advertising videos or sequences of static image works) during a communication session with a person. The communication of the media content may be via a website and displayed using a browser, a telephone network for display on a telephone, a television network (e.g., cable or satellite) for display on a television (interactive television or otherwise). As shown at block 454, the method 450 may comprise receiving a first signal identifying a request to play media content (e.g., the advertisement video works or a sequence of static images). This first signal may represent a logon (e.g., see communication 340 in the interaction diagram 350) to the visual presentation website or program, or a request signal from the viewer already logged on the site, to play the media content. In an example embodiment, in response to this logon, the system 400 may present a customized visual presentation for the user/viewer identified by the logon.

Thereafter, as shown in block 456, the method 450 may initiate presentation of a first advertisement media component (e.g., a first advertising video or a sequence of static images work) in response to the first signal (e.g., see communication 344 in the interaction diagram 350). As noted, the media content could be prerecorded or be a live feed or a live performance or an advertisement dynamically generated. As mentioned above, the advertisement media database 104 may include a plurality of advertisement media components provided by one or more advertising agencies. Referring to FIG. 1, in an example embodiment, the live feed may be communicated to the interactive or viewing devices via the communication network 54.

As shown in block 358, one or more second signals representing that a viewer is viewing or has completed viewing the first advertisement media component may be received (e.g., may be received by the system 400). This second signal may be in response to the viewer clicking on a mouse or a television remote control, or providing some other electronic indication that the viewer is present and viewing the advertisement media components. In an example embodiment, each different second signal received represents that the viewer is viewing a given advertisement media component at different discrete times during the playing of the advertisement media component. The system 400 may be configured to only continue playing the advertisement video work or advancing to the next frame in the sequence of static images if an appropriate second signal is received.

The method 450 also comprises operating a first electronic process to award a sweepstakes entry when one or more first criteria are met related to receiving the one or more second signals (see block 460 and, for example, the operation 342 in FIG. 12A).

For example, the first criterion may comprise a requirement to receive a second signal every ten seconds throughout the playing of the advertisement media component to indicate that the viewer is continuing to watch the advertisement media component before a sweepstakes entry is awarded.

Alternatively, the first criterion could comprise requiring a predetermined number of second signals to be received before a sweepstakes entry is awarded. The first criteria may comprise receiving a second signal from the viewer at the end of the advertising visual. Alternatively, the first criterion may comprise awarding a sweepstakes entry on the receipt of every second signal. Additionally, there may be a selection of a first criterion to be used with a particular viewer based on the profile of the viewer or based on demographics of the viewer, such as the age or income or geographic location of the viewer, or based on a number of communications sessions with this particular viewer. The particular one or more first criteria used is not limiting on the example embodiments.

Alternatively, the method 450 may comprise operating a second electronic process to generate a notice of an award when one or more second criteria relating to viewing by the viewer is met (see also block 460). The second criterion may comprise a random award only requiring that the viewer be viewing or have just completed viewing an advertising visual. Alternatively, the second criterion could comprise generating the notice of an award after a given number of advertisement media components have been viewed, or after a given amount of time has elapsed. Additionally, there may be a selection of a second criterion to use for a particular viewer based on the profile of the viewer or based on demographics of the viewer, such as the age or income or geographic location of the viewer, or based on a number of communications sessions with this particular viewer. The second criterion used are not limiting on the example embodiments. The award allocation module 116 (see FIG. 2) may, for example, perform the operations in block 460.

In an example embodiment, the system 400 could operate both the first electronic process to award, when the one or more first criteria are met related to receiving the one or more second signals, one or more sweepstakes entries, and the second electronic process to generate, when the at least one second criterion relating to viewing by the viewer is met, a notice of an award of a prize.

In a further embodiment, the method 450 comprises performing a third electronic process to cause a second advertisement media component to be presented only if at least a third criterion related to receiving the one or more second signals is met. In an example embodiment, the third criterion is that one of the second signals received was generated at a conclusion of playing the first advertisement media component. Thus, in an example embodiment, the system 400 does not play the next advertising visual unless there are second signals received indicating that the viewer has watched the entire first advertising visual. This third criterion could alternatively comprise requiring receipt of second signals indicating a particular desired viewing pattern. Alternatively or in addition, there may be a selection of a third criterion to be used with a particular viewer based on the profile of the viewer or based on demographics of the viewer, such as the age or income or geographic location of the viewer, or based on a number of communications sessions with this particular viewer, to name but a few.

In a further example embodiment, where the method 450 performs the first electronic process of awarding one or more sweepstakes entries based on receiving the one or more second signals, the operation of providing a visual presentation of a visual indicator showing a running tally of sweepstakes entries awarded to the viewer or showing a link thereto is performed. By way of example, a dashboard or other display may be provided in a corner of the screen indicating the running tally of sweepstakes entries awarded to the viewer (e.g., the award indicator 256 shown in the GUI 250 (see FIG. 8)).

In a further example embodiment, where the method 450 performs one or both of the first electronic process and the second electronic process, the operation of providing in the visual presentation a visual indicator showing one or more recent awards of sweepstakes or prizes to one or more third parties or a link thereto is performed.

A dashboard or other display may be provided in a corner of the screen indicating the award. Demographics on the recipients of the sweepstakes or awards may be provided, and actual awardee identities may be listed where appropriate permissions have been obtained. In an example embodiment, awards received by users in a friends list (e.g., the "MY FRIENDS LIST" shown in display area 254—see FIG. 8) may be displayed in the dashboard or any other graphical user interface.

In a further example embodiment, an electronic process may be run to determine a sequence of advertisement media components to be shown to a particular viewer based on a fourth criterion. In an example embodiment, the fourth criterion is a number of times the viewer has logged in to the system 400 (or the media system 100) and viewed advertisement visuals. In another example embodiment the fourth criterion comprises excluding advertisement media components that have been played for the viewer during a time period. In a further example embodiment, the fourth criterion is based on a level of payment by each of the respective advertisers for particular time slots for presentation of their respective advertisement media components. In yet a further example embodiment, the fourth criterion is based on whether a particular number of viewings of the advertisement media components contracted by the advertising company have been attained.

In a further example embodiment, an electronic process may be run to generate a rotation of advertisement media components of different advertisers. The rotation may begin at different advertisement media components at every logon by the same viewer during a period.

In a further example embodiment, the electronic operations are performed of generating and presenting or having presented visually or aurally a request to the viewer to generate the one or more second signals. For example, text may be set to appear on the viewer's screen or the viewer's interactive device (e.g., computer) may generate a beep at a particular point in the advertisement media component to indicate that it is time for the viewer to initiate the second signal, for example by clicking the mouse on the viewer's computer or other appliance.

In the an example embodiment where the second electronic process is performed and a notice of an award is presented to the viewer, the method 450 may further include facilitating, during the communication session, an electronic method for accepting the award, and crediting the award to the user only if a signal is received within a period of time in which to accept the award. In one implementation, the electronic method for accepting the award may comprise placing an acceptance button or other icon on a display screen that may be clicked by a viewer to accept the award (e.g., see also communication 347 and 366 in the interaction diagram 350). For example, a Java applet could be included in an HTML page and the applet code could be transferred to the viewer's computer browser and executed. The electronic operation of facilitating crediting the award to the viewer may comprise awarding a prize or providing data to a fulfillment operation to award the prize only if an acceptance signal is received from the viewer's computer within a predetermined period of time.

In an example embodiment where the second electronic process is performed, the second criterion may comprise receiving a predetermined number of second communications from the viewer. Alternatively, the second criterion may comprise randomly awarding a prize during a communication session with the viewer. In a further example embodiment, the second criterion may comprise making a random award of the prize only during the presentation of an advertisement media component. Alternatively, the second criterion may comprise making a random award of a prize only after the presentation of an advertisement media component. Alternatively, the second criterion may be varied/changed on a random or periodic basis.

In a further example embodiment, the method 450 may comprise receiving electronically a designation of a charity to receive the award, and facilitating crediting of the award to the charity. The receiving of the designation of a charity may comprise receiving a selection of a charity from a charity list in a menu or receiving a charity input designation from the viewer (e.g., see the display area 280 in FIG. 9). The electronic operation of facilitating award of the prize could comprise awarding the prize or providing data to a fulfillment operation to award the prize. In an example embodiment, the award processing module 118 may process the fulfillment of the award.

In an example embodiment where the first electronic process is performed, the first electronic process may be configured to monitor for second signals received during the presentation of one of the advertisement media components. The first criterion used in this process may comprise awarding a sweepstakes entry only if a second signal is received every five seconds during the playing of the advertisement media components. Alternatively, the first criterion could comprise only awarding a sweepstakes entry if a second signal is received substantially at a time of completion of the presentation of the media components.

Alternatively, the first process may comprise the electronic operation of generating a sequence of advertisement media components that play for different lengths of time and the first criterion may comprise facilitating an award of a sweepstakes entry only if a second signal is received substantially at a time of completion of the presentation of the given advertisement media components.

In a further example embodiment, a computer is programmed to terminate a communication session with the viewer after a period of time of viewing has lapsed. By way of example, the communication session may be terminated on a random basis, or on a periodic basis, or after a predetermined time has elapsed, to name but a few.

As mentioned above, one or more entertainment media components may be interspersed with the one or more advertisement media components during a communication session presented to a viewer. In an example embodiment, the entertainment and the advertisement media components may be displayed together in different parts of a viewer's screen. The term "entertainment session" should be interpreted broadly, and may comprise entertainment video works, live feeds, video streaming, connections to games, interactive sites, online computing including cloud computing, to name but a few. An entertainment session may comprise a sequence of displaying one or more entertainment media components. The term "interspersing" should be interpreted broadly, and may comprise placing an entertainment media component after every advertisement media component, (e.g., see the video stream 130 shown in FIG. 3) or after every second advertisement media component, or after a prescribed time, or based on any other criterion, to name but a few.

In an example embodiment where entertainment sessions are electronically interspersed with or played at the same time as the advertisement media components during a viewing session, the method 450 may include requesting the viewer to select one or more of the entertainment media components for presentation during the communication session. By way of example, this operation may be accomplished by the presenting a menu or index of available entertainment media categories and/or entertainment media components that may be selected. By clicking or otherwise indicating a selection of one of the entertainment categories, the entertainment media components from the selected entertainment category may be interspersed with advertisement media components and streamed to the viewing device (e.g., the interactive device 52). In an example embodiment, the viewer may select individual entertainment media components that may then be interspersed with advertisement media components and streamed to a viewing device. It should be appreciated that the advertisement media components may include video and/or a sequence of static images, and the advertisement media components may be interspersed or played at the same time in any desired combination.

In a further example embodiment relating to the interspersing or playing together the entertainment and advertisement media components, the method 450 may comprise determining a number of times an entertainment media component is played by the system 400 or 50, and an award may then be calculated based on a number of times the particular entertainment media component work is played.

In a further example embodiment relating to the interspersing or playing together entertainment media and advertisement media components, an operation is provided of presenting a selectable list of well known persons, by way of example, via a pull down menu or index, and receiving electronically a selection of one of the well-known persons on the selectable list. Thereafter, one or more entertainment associated with the well-known person may then be communicated to the viewer device. The term "well known person" is intended to include a film or television star, a sports star, a music star, a celebrity, a politician, to name but a few. In a further example embodiment, the operations may be provided of accumulating during a period, for each well-known person, a number of times they were selected in the visual presentation by one or more viewers. In an example embodiment, the award processing module 118 may calculate an award based on the number of times the well-known person was selected during the period. In an example embodiment, this award could be designated for a charity. A further operation may be included of sending or having sent the award to the designated charity (e.g., using the award processing module 118).

In an example embodiment, the method 450 may include providing a control arrangement to allow the viewer to skip one or more of the advertisement media components. By way of example, this may be accomplished using the GUI 250 shown in FIG. 8. In an example embodiment, a Java applet could be included in an HTML page and the applet code could be transferred to the viewer's computer browser and executed.

In an example embodiment, the method 450 may include presenting a selectable list of advertising subjects, for example via a menu or index. The system 400 or 100 may then receive a selection of one of the advertising subjects or a selection of a specific advertisement media component from a viewer device. For example, the menu of subjects may include product types, service types, movies or other entertainment advertisements, vacations, games, to name but a few. After receiving the selection, advertising media components associated with the selection may be communicated to the viewer device that may then play the advertisement media components.

In a further example embodiment, a method is provided to allow a viewer to request additional information about a product or service or link to an appropriate website related to the product or service that is the subject of the advertisement media component. In an example embodiment, the requesting of more information could comprise placing a button or other icon on the screen that may be clicked by a viewer to send a request for more information, or to link the viewer to a website related to the product or service. For example, a Java applet could be included in an HTML page and the applet code could be transferred to the viewer's computer browser and executed. When a communication is received identifying a request for additional information about an advertisement video media component during a viewing session, an appropriate electronic action may be taken based on the request, such as presenting one or more web information pages or linking to an appropriate website. In some example embodiments, the request may be logged in a database (e.g., the management database 108). Data about the viewer may be provided to an advertiser, making an additional charge to the advertiser based on the request, or facilitating communication between the advertiser and the viewer, to name but a few.

In a further example embodiment, the method 450 may comprise presenting a selectable list of interactive games during a communication session to be interspersed or played at the same time as the advertisement media component. This example embodiment may further include receiving a signal indicating a selection of one of the interactive games, and presenting directly, or via a link, the one interactive game during the communication session interspersed or at the same time as the advertisement video media components. In a further enhancement of this example embodiment, the method 450 may include receiving one or more third signals representing an interaction, or results of an interaction, with the selected interactive game. For example, the third signals may indicate a threshold score from the game, e.g., scoring 100 pts. When the threshold score is achieved or exceeded, an award (e.g., more sweepstakes entries, money, special service at a car dealership, a trip to attend a game, free game participation minutes, to name but a few) based in part on receiving the one or more third signals and/or the one or more second signals. For example, the systems 50, 400 may include server (e.g., implement the media system 100) may be programmed to issue points for playing a game or awarding a prize only after the viewer has watched a specified number of ads, as evidenced by the receipt of the second signals. The award processing module 118 may control crediting of the awards.

In yet a further example embodiment, the method 450 may obtain information indicating one or more demographics of the person viewing the media content. By way of example, this demographic information could be obtained by accessing a stored profile of the viewer, or by sending a request to another server to obtain the information. This example embodiment may further include selecting at least some of the advertisement media components based on the one or more demographics of the viewer.

In a further example embodiment, the method 450 allows a viewer to submit a rating for one of the advertisement media components. A server (e.g., the media system 100) may then rate the advertisement media component based on the feedback received from the viewer. In an example embodiment, other advertisement media components may be selected for communication to the viewer based on this rating information. The server may forward the rating information from the at least one viewer to the creator or sponsor of the advertisement media component. In a further example embodiment, information relating to the same advertisement media component received electronically from other viewers in other communication sessions may be sorted and aggregated. Information relating to the sorted individual ratings may then be sent to the provider of the advertisement media component, or displayed on a webpage associated with the provider (or advertisement creator).

In an example embodiment, the method 450 may comprise accessing electronically a profile of the viewer, obtaining from the profile an identification of at least one media component, obtaining electronically at least one scene or still image from the media component, and presenting the media component to the viewer during a communication session with the viewer. The media component may be a movie, television program or the like viewed by the viewer or referenced in the profile. The media component may also be some other entertainment work such as a book.

The method 450 may include receiving a membership list from an organization (e.g., a chess club, a bridge club, a knitting club, an investment club, a fantasy sports league, or the like) and monitoring viewing sessions of persons who are members of the organization. The method 450 may then monitor when members of the organization view one or more advertisement media components and credit the organization with an award (e.g., using the award allocation module 116). For example, the award may comprise an amount of money based on the number of advertisement media components viewed by members of the club or league, etc. The method 450 may include accumulating and sorting, electronically per advertiser, viewings by persons of advertisement media components.

Permission may be received from one or more persons to allow direct communication between an advertiser and the respective person. The permission may be received electronically or by the receipt of a mail-in card granting such permission. In an example embodiment, the media system 100 may facilitate obtaining the aforementioned permissions.

Figure 16:
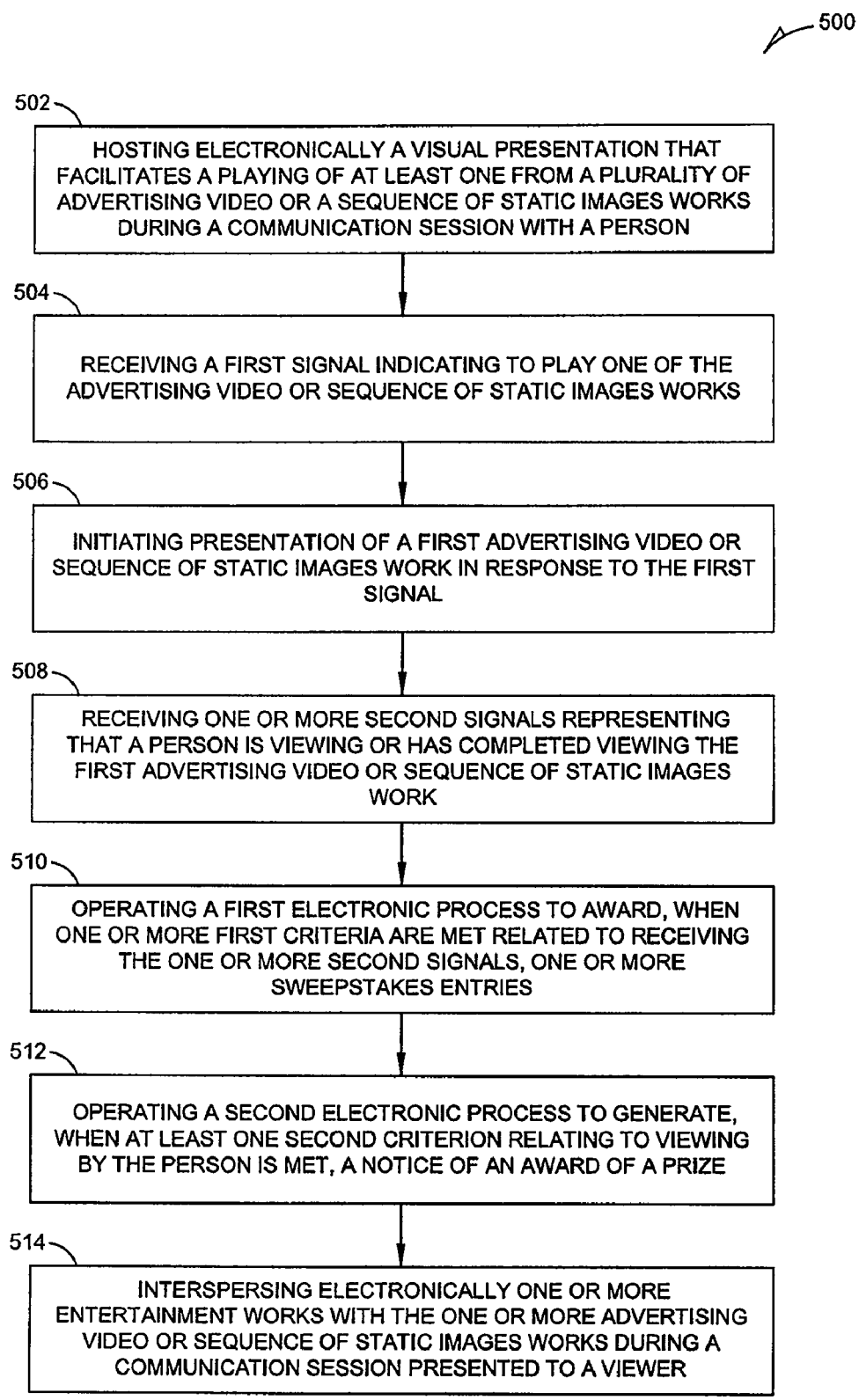
FIG. 16 shows a flowchart of a further method, in accordance with an example embodiment, for presenting media content to a plurality of viewer devices and processing rewards associated with the media content.

FIG. 16 shows a flowchart of a further method 500, in accordance with an example embodiment, for presenting media content to a plurality of viewer devices (e.g., the interactive devices 52) and processing rewards associated with the media content.

As shown at block 502, the method 500 comprises facilitating and making available for playing at least one of a plurality of advertisement media components during a communication session with a viewer. The advertisement media components may be advertisement video works or a sequence of static images. Thereafter, as shown at block 504, the method 500 comprises receiving a first signal that indicated a request to play one of the advertisement media components. This first signal may represent a log-on to the system 50, 400 via a web interface, or a request signal from the viewer to play one of the advertisement media components, or other appropriate signal indicating that the advertisement media components should commence.

Presentation of a first advertisement media component may then be initiated in response to the first signal (see block 506). One or more second signals representing that a person is viewing, or has completed viewing, the first advertisement media component may be received (see block 508). This second signal may be in response to the viewer clicking on a mouse or a television remote control, or providing some other electronic indication that the viewer is present and viewing the advertisement media components. In an example embodiment, each different second signal received represents that the person is viewing a given advertisement media component at a different discrete time.

As shown in block 510, the method 500 may include performing a first electronic process to award a sweepstakes entry when one or more first criteria related to receiving the one or more second signals are met. In an example embodiment, the award processing module 116 may process the sweepstakes entry.

A notice of an award of a prize may be generated as shown in block 512. The notice may be displayed to the user via the award indicator 256 shown in the GUI 250. In an example embodiment, the awarding of the prize is based on if one or more second criteria relating to viewing by the person is met.

As shown in block 514, one or more entertainment sessions (e.g., including one or more entertainment media components) may be interspersed with the one or more advertisement media components during a communication session. It will be appreciated that this operation may be included in the operations shown in block 506.

In view of the above, a variety of different example embodiments may be implemented. For example, a visual presentation could be provided to a viewer for a specified period of time, such as one minute, with sweepstakes entries and/or prizes awarded for viewing during this specified period. Advertisers could provide daily/weekly specials that are provided to website viewers or members. A viewer may place an order for a special by clicking through, or completing, a web form on a presentation site. In a further example embodiment, an online "shopping center" may be implemented and associated with or linked to the systems 50, 400.

In a further example embodiment an entertainment session, during which one or more entertainment media components are presented, may provide access to a gossip/trivia site. In addition or instead, a link to a gossip/trivia site may be provided via a graphical user interface (e.g., the GUI 250 shown in FIG. 8). The entertainment session may comprise access to a one or more blogs. In an example embodiment, a link to one or more blogs is provided via a graphical user interface (e.g., the GUI 250). Such blogs may include blogs for celebrities or a viewer's blog members can communicate with selected celebrities or among themselves.

In an example embodiment, the systems 50, 400 may provide host email accounts and/or provide instant messaging (IM) functionality. Accordingly, in order to attend to email or IM communications, a logon to a website hosted by the systems 50, 400 may be required thereby being exposed to the media content provided by the systems 50, 400.

In a further example embodiment, when a viewer signs up with the media system (e.g., the media system 100), and provides their birth date, the viewers horoscope may be provided, for example, as a pop-up window, or as part of an entertainment session. The horoscope, in an example embodiment, may pop up automatically upon the member's first sign-in/log-on for a 24 hour period, or alternatively, could be sent to their e-mail account.

In an embodiment a side bar or other display window could be displayed when a member/viewer signs up or logs-on, displaying the weather for their location. The weather for the viewer's location may be determined based on the city and state of residence of the viewer, or based on IP address location. By way of example, the presentation site could present a "sidebar" on a viewer's customized homepage with the daily weather for their area. Alternatively, the weather could be sent to their email address. Alternatively, a live Doppler feed may be presented on the viewer's customized page.

Figure 17:
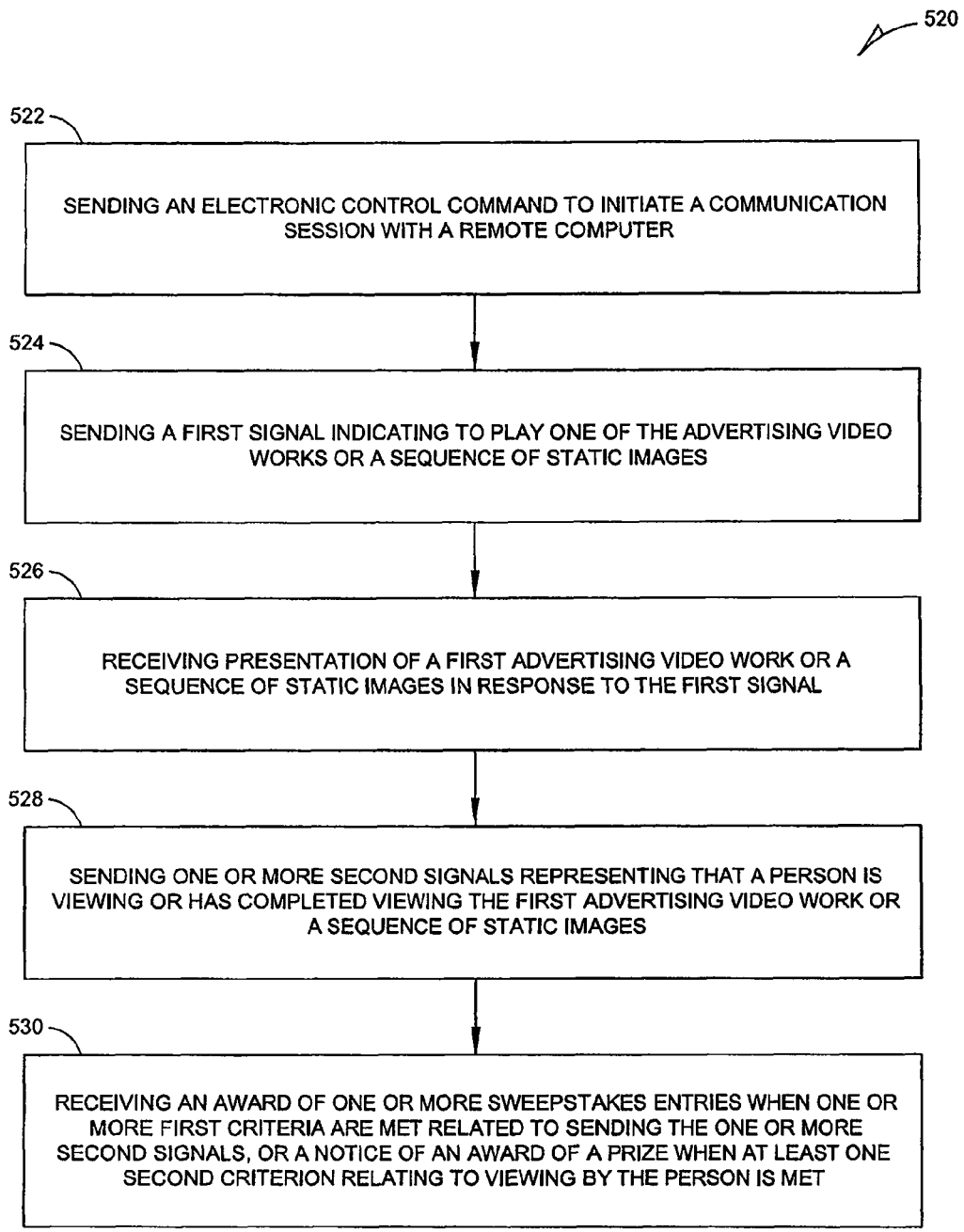
FIG. 17 shows a flowchart of yet a further method, in accordance with an example embodiment, for presenting media content to a plurality of viewer devices and processing rewards associated with the media content.

FIG. 17 shows a flowchart of yet a further method 520, in accordance with an example embodiment, for presenting media content to a plurality of viewer devices and processing rewards associated with the media content. The method 520 may be deployed in the media system 100 and, accordingly, is described by way of example with reference thereto. In particular one or more of the interactive devices 52 may perform the method 520.

As shown at block 522, an electronic control command may be sent to initiate a communication session with a media system (e.g., the media system 100). For example, an interactive device 52 may send a communication to the media system 100 to provide a graphical user interface (e.g., the GUI 200 shown in FIG. 7) to logon to a website hosted by the media system 100. Thereafter, as shown in block 524, a first signal may be sent by the interactive device 52 to the media system 100 identifying that the user has requested playing of an advertisement media component (e.g., an advertisement video work or a sequence of static images). In addition or instead, the first signal sent by the interactive device 52 may identify that the user has requested playing of entertainment media components (e.g., using the GUI 200).

In response to the first signal, the media system 100 may then generate a media session comprising media content including advertisement and entertainment media components. As shown by way of example in FIG. 3, the media content may be streamed to the interactive device 52 in the video stream 130 to the interactive device 52 for viewing by a user. Accordingly, as shown in block 526 the method 520 may comprise receiving presentation (e.g., the video stream 130) of a first media component (e.g., an advertisement video work or a sequence of static images) in response to the first signal. Thereafter, as shown in block 528 one or more second signals representing that a person is viewing, or has completed viewing, the first advertisement media component may be communicated from the interactive device 52 to the media system 100. The media system 100 may then make a determination as to whether or not the viewer has won an award for viewing the media content. In an example embodiment, the award allocation module 116 may make this determination. When an award is allocated, the interactive device 52 may then receive an award of one or more sweepstakes entries (see block 530). The award may be allocated when one or more first criteria are met related to sending the one or more second signals, or a notice of an award of a prize when at least one-second criterion relating to viewing by the person is met.

Figure 18:
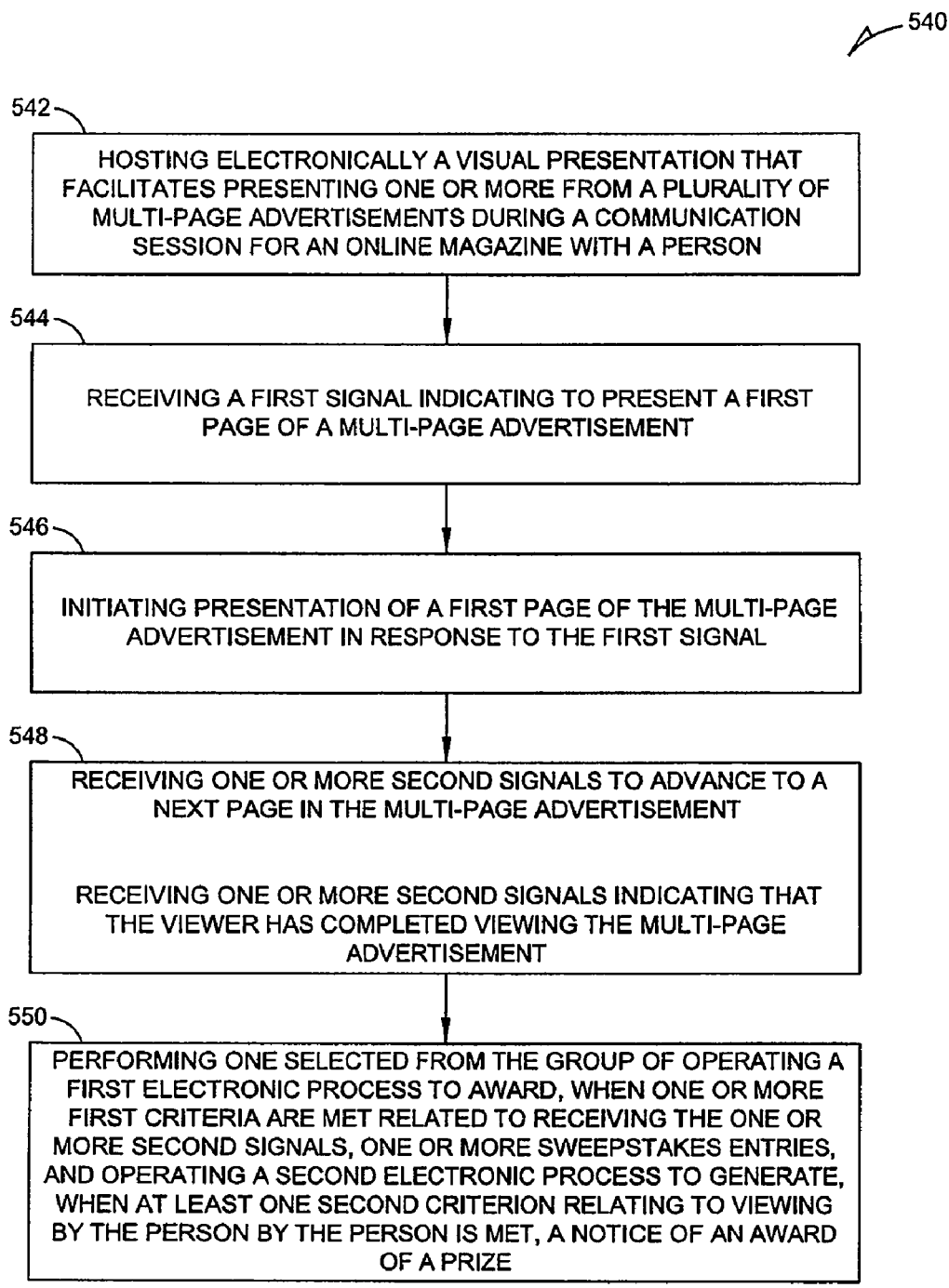
FIG. 18 shows a flowchart of yet a further method, in accordance with an example embodiment, for presenting media content to a plurality of viewer devices and processing rewards associated with the media content.

FIG. 18 shows a flowchart of yet a further method 540, in accordance with an example embodiment, for presenting media content to a plurality of viewer devices and processing rewards associated with the media content. The method 540 may be deployed in the system 50 and, accordingly, is described by way of example with reference thereto.

As shown at block 542, the method 540 may include hosting electronically (e.g., via a web server) a visual presentation that facilitates presenting media content in the form of one or more from a plurality of multi-page advertisements during a communication session with a person. The plurality of multi-page advertisements may form part of an online magazine.

The method 540 may include one or more graphical user interface that allows a user to logon to enter requests for viewing pages of the online magazine. For example, as shown at block 544, method 540 may include receiving (e.g., at the media system 100) a first signal from a remote interactive device 52 and requesting a first page of a multi-page advertisement. Thereafter, the method 540 may include initiating presentation of a first page of the multi-page advertisement in response to the first signal (see block 546). For example, the media system 100 may retrieve advertisement media components from the advertisement database 104, retrieve entertainment media components from the entertainment database 106 and generate a video stream for communication to the interactive media device 52. In an example embodiment, the media stream may be generated in response to user input via a graphical user interface similar to the GUI 200.

The method 540 may then monitor whether or not the user is paying attention to the media content being displayed on the interactive device 52. For example, as shown in block 548, the method 540 may include receiving electronically one or more second signals to advance to a next page in the multi-page advertisement. In an example embodiment, one or more second signals may be received that indicate that the viewer has completed viewing the multi-page advertisement.

As shown in block 550, the method 540 may include performing a first electronic process to allocate an award (e.g., using the award processing module 118) when one or more first criteria related to receiving the one or more second signals are met. The award may, for example, include one or more sweepstakes entries. A second electronic process may be executed to generate a notice of an award of a prize when at least one-second criterion relating to viewing by the person is met (e.g., see the award indicator 256 in FIG. 8). As mentioned above, the media content may be shared via a social network with one or more friends and any awards that may be won can be apportioned (e.g., see display area 280 in FIG. 9).

In an example embodiment related to the online magazine, the magazine presentation may set up to work as a regular magazine with the viewer turning pages by performing an electronic function. The method 540 may make the viewer eligible for a jackpot and/or an instant reward when either clicking on one or more pages of an advertisement sequence of pages and/or clicking on content. The viewer may also click for additional information on a displayed advertisement. When a viewer clicks to obtain additional information, the user may be entered into another opportunity for the sweepstakes or be eligible for an instant prize or a discount on the advertised product or service.

The media content presented to the viewer may be a combination of feed(s) from the Internet, feed(s) for television show or any other feed providing media content.

In an example embodiment, the systems 50, 400 are configured so that a user may select (e.g., click on using a mouse) media content (e.g., advertisement media content and/or entertainment media content) that may then be associated with the user's homepage, downloaded to a user's interactive device 52, or stored in any other repository that the user may then access at his or her convenience.

In an example embodiment, the system 50, 400 (e.g., using the media system 100) may include software and hardware to allow a user to select and combine media content to provide personalized media content. For example, the software and hardware may host a website that provide data storage and editing functionality to allow a user to compile an online scrapbook. Thus, in an example embodiment, the user may electronically compile an electronic scrapbook of articles of any content, videos, static sequences of content, selected by the participant, and arranged in a scrapbook format. Such an electronic scrapbook may be stored at a server or sent to other convenient storage, such as the viewer's repository. For example, the user management module 120 (see FIG. 2) may facilitate compilation of the scrapbook and store the scrapbook in the management database 108. This creation and compilation of a scrapbook for the viewer may be done for a fee.

Additionally, example embodiments including the online magazine functionality, as well as any of the other example embodiments, may include the further feature of providing programming to electronically select advertisement media components based on the user's age, location, gender demographics and/or other information. Thus, in an example embodiment, the media content for a particular user may be selected based on one or more criteria. For example, selection of new content may be based on the media content (e.g., advertisements media content and/or entertainment media content) already viewed by the user, or based on which media content the viewer has clicked through, or based on the number of times the user has accessed an online magazine in a given time period. In addition or instead, the selection of new media content may be based on a viewer selection identifying content of interest or a number of viewings paid for by the advertiser.

In an example online magazine embodiment, a homepage may be provided that can be customized to alert the viewer of media content (e.g., advertisement and/or entertainment media components) of particular interest to a particular viewer. This feature may further include the facilitation of electronic alerts regarding the availability of such media content. Such alerts may be sent to an interactive device 52 associated with the user (e.g., sent to a cell phone, personal digital assistant (PDA), computer, or the like).

As mentioned above, in an example embodiment the user may skip viewing of one or more media components (e.g., see the GUI 250 shown in FIG. 8). In an example embodiment, the system 50, 400 may be configured to remove the user from eligibility for a jackpot, for receiving an instant prize, or from receiving one or more sweepstakes entries if the viewer skips one or more advertisement media components. The user may be provided with an option to click a button (e.g., via the SKIP button 258.5) at the beginning, or during presentation of the advertisement media component, if they wish to skip it. If they skip viewing an advertisement media component, in an example embodiment, the user may not be informed whether they have changed a pattern (random or otherwise) of distribution of instant prizes due to this skipping action. In another embodiment, the viewer may be shown a visual indication of how the pattern or algorithm for awarding instant prizes has been changed by their action. In an example embodiment, the system 50, 400 may be configured so that skipping viewing of an advertisement media component may not change the chances of winning an award. Thus, skipping a current advertisement media component may lead to a next media component announcing a prize, or it may lead to another advertisement or entertainment media component. In an example embodiment, the user will not know whether they have or will be awarded one or more entries in the sweepstakes or will be awarded a prize until they have viewed the advertisement or skipped it.

As mentioned above, in an example embodiment, the user can skip viewing advertisement and/or entertainment media components by clicking/making a selection at the start of the media component or any time during the viewing of a media component. In an example embodiment, a viewing session of the user may be terminated (and, optionally, blocked from logging back in on the same day) if a threshold number of advertisement media components are skipped, for example, a threshold number out of the total number of advertisement media components presented.

As shown in the GUI 250, in some example embodiments controls may be provided to allow a user to navigate through media content. For example, a graphical user interface including a scroll bar for scrolling forward or backward, and navigation buttons providing fast forward, slow, skip forward, and other functionality. These controls may allow a user to determine the media components he or she wants to watch and jump ahead or skip through media components the user does not want to watch. However, if the users actions indicate that he is not watching at least a threshold percentage or number of advertisement media components, the user's session may be terminated. Clicking a button to go to a next media component or some other action may be required to show that the user is paying attention.

In an example online magazine embodiment, identification of the exact online magazine page that the viewer was viewing when he/she signed off of a website may be recorded. When the user, logs in to the website at a later time or date, the user may be returned the exact page he or she was viewing at sign-off. This operation may be programmed to be performed automatically upon log-in, or based on a viewer selection of an option to be taken back to this page.

In an example online magazine embodiment, the user may view the online magazine for as long as they choose. Accordingly, the user's access may not be terminated after a determined time period or based on a criterion.

In a further feature, the online magazine system may be programmed to select advertisement media components may be presented randomly before, during, or after the presentation of entertainment media components.

In an example embodiment, the media content may include awards concealed within the advertisement. In order to claim the award, the user may then be required to use a pointing device (e.g., a mouse) to select the concealed award (e.g., click on a bumper of a truck to claim a prize where the concealed prize is located on the bumper).

In a further feature which may be added to either the online magazine system and/or the video system, programming may be included to kick the viewer off the site or program, e.g., terminate the session with the viewer, and not allow the viewer back for a set period of time or until another criterion is met, if the viewer has skipped one or more videos, advertisements or entertainment content, in whatever form, or skipped videos, advertisements or entertainment content for a certain amount of time.

Figure 19:
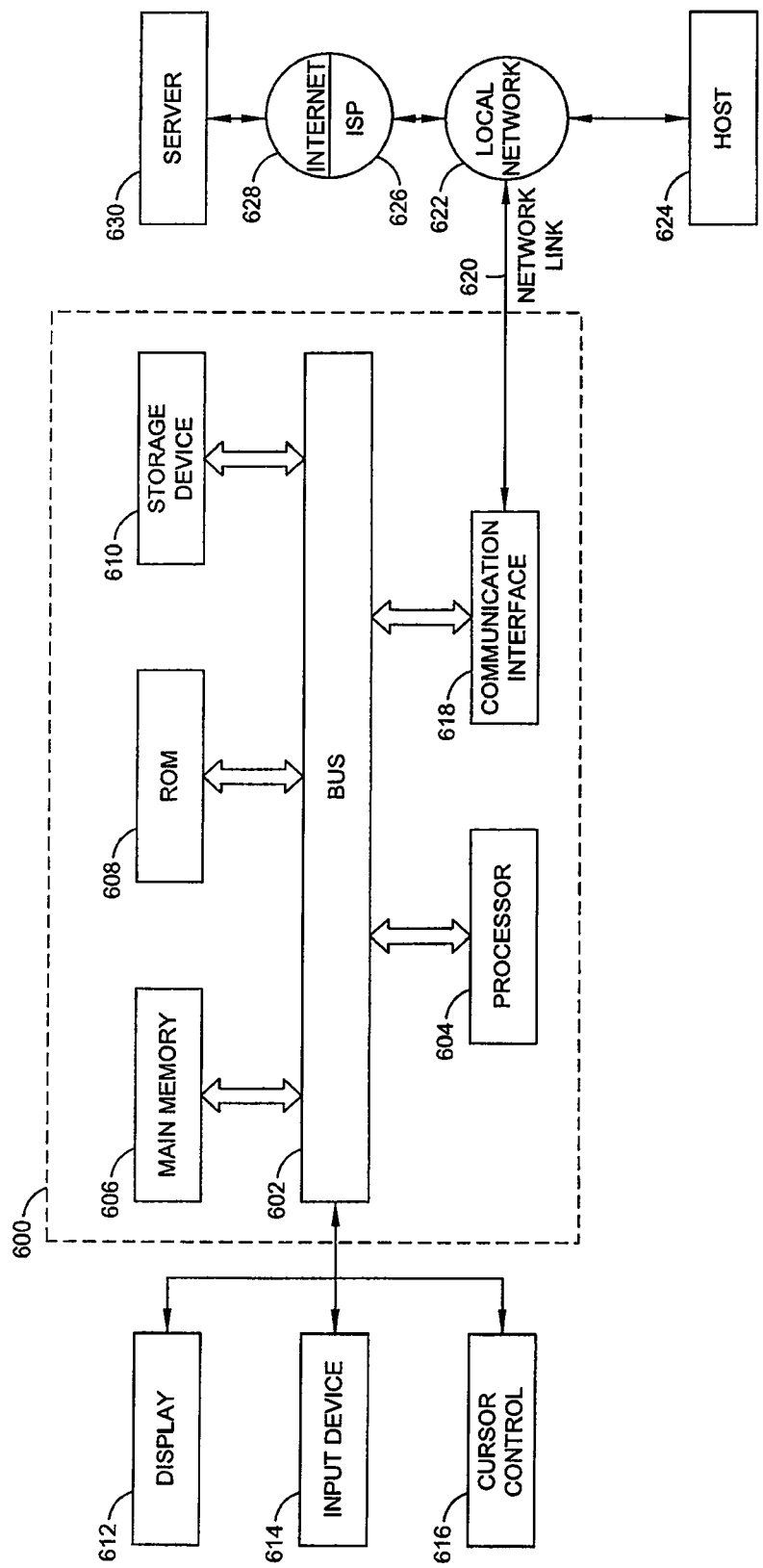
FIG. 19 shows a computer device, in accordance with an example embodiment, for performing any one or more of the methodologies described herein.

FIG. 19 shows a computer device 600, in accordance with an example embodiment, for performing any one or more of the methodologies described herein. The computer system 600 includes a bus 602 or other communication mechanisms for communicating information, and a processor 604 coupled to the bus 602 for processing information. The computer system 600 also includes a main memory 606, such as a random access memory (RAM) or other dynamic storage device, coupled to the bus 602 for storing information and instructions to be executed by the processor 604. The main memory 606 may also be used for storing temporary variables or other intermediate information during execution of instructions by the processor 604. The computer system 600 further includes a read only memory (ROM) 608 or other static storage device coupled to the bus 602 for storing static information and instructions for the processor 604. A storage device 610, such as a magnetic disk or optical disk, is also provided and coupled to the bus 602 for storing information and instructions.

The computer system 600 may be coupled via the bus 602 to a display 612, for displaying information to a computer user. An input device 614, including alphanumeric and other keys, is coupled to the bus 602 for communicating information and command selections to the processor 604. Another example user input device is a cursor control 616, such as a mouse, a trackball, or cursor direction keys for communicating direction information and command selections to the processor 604 and for controlling cursor movement on the display 612.

An example embodiment is related to the use of the computer system 600 programmed to perform the processing as described by way of example herein. The processor 604 may execute one or more sequences of one or more instructions loaded from the main memory 606. Such instructions may also be obtained from another computer-readable medium, such as the storage device 610. Execution of the sequences of instructions causes the processor 604 to perform the process steps described herein. The one or more processors may be configured in a multi-processing arrangement. In alternative example embodiments, hard-wired circuitry may be used in place of, or in combination with, software instructions to implement the methodologies described by way of example herein. Thus, example embodiments are not limited to any specific combination of hardware circuitry and software.

Those skilled in the art will appreciate that the example embodiments may be practiced in network computing environments with many types of computer system configurations, including personal computers, hand-held devices, mobile telephones, multi-processor systems, microprocessor-based or programmable consumer electronics, network PCs, minicomputers, mainframe computers, to name but a few. The example embodiments may also be deployed in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

In a networked environment, the computer may operate using logical connections to one or more other computers having processors. Logical connections may include a local area network (LAN) and a wide area network (WAN) that are presented here by way of example and not limitation. Such networking environments are commonplace in office-wide or enterprise-wide computer networks, intranets (a network belonging to an organization, usually a corporation, accessible only by the organization's members, employees, or others with authorization). Like the Internet itself, intranets are used to share information.

To facilitate this communication, the computer system 600 also includes a communication interface 618 coupled to the bus 602. The communication interface 618 provides a two-way data communication coupling to a network link 620 that is connected to a local network 622. For example, the communication interface 618 may be an integrated services digital network (ISDN) card or a modem to provide a data communication connection to a corresponding type of telephone line. As another example, the communication interface 618 may be a local area network (LAN) card to provide a data communication connection to a compatible LAN. Wireless links may also be implemented. In any such implementation, the communication interface 618 may send and receive electrical, electromagnetic or optical signals that carry digital data streams representing various types of information.

Accordingly, the network link 620 may provide the capability for data communication through one or more networks to other data devices. For example, the network link 620 may provide a connection through the local area network 622 to one or more host computers 624 or to data equipment operated by an Internet Service Provider (ISP) 626. The ISP 626, in turn, provides data communication services through the worldwide packet data communication network, now commonly referred to as the "Internet" 628. The local network 622 and the Internet 628 both use electrical, electromagnetic or optical signals that carry digital data streams. The type of network link is not limiting on the example embodiments.

The computer system 600 can send messages and receive data, including program code, through the network(s), the network link 620, and the communication interface 618. If the Internet is used, a computer server 630 might transmit requested code for an application program through the Internet 628, the ISP 626, the local area network 622 and the communication interface 618. In accordance with an example embodiment, one such downloaded application may provide for processing as described herein. The processor 604 may execute the code as it is received, and/or store it in storage device 610, or other non-volatile storage for later execution.

Example embodiments within the scope of the present disclosure also include computer-readable media for storing computer-executable instructions or data structures thereon. Such computer-readable media can be any available media, which can be accessed by a general purpose or special purpose computer. By way of example, and not limitation, such computer-readable media can comprise RAM, ROM, EPROM, EEPROM, CD-ROM or other optical disk storage, magnetic disk storage or other magnetic storage devices, or any other medium which can be used to store desired program code in the form of computer-executable instructions or data structures and which can be accessed by a general purpose or special purpose computer. The computer-executable instructions may comprise, for example, instructions and data which configure a general purpose computer, special purpose computer, or special purpose processing device to perform a certain function or group of functions. Computer-executable instructions may also be properly termed "software" as known by those of skill in the art.

Program code or software includes one or more program modules and may be stored on the hard disk, magnetic disk, optical disk, ROM or RAM, and may include an operating system, one or more application or software programs, other program modules, and program data. In some example embodiments, the program(s) may be deployed and accessible on the Internet and operate within Web browsers.

Example embodiments have been described in the general context of methods which may be implemented in an example embodiment by a program product including machine-executable instructions, such as program code, for example in the form of program modules executed by machines in networked environments. Generally, program modules include routines, programs, objects, components, data structures, etc. that perform particular tasks or implement particular data types. Multi-threaded applications may be used, for example, based on Java or C++. Machine-executable instructions, associated data structures, and program modules represent examples of program code for executing the methods disclosed herein. It should be noted that the operations described with respect to the various example embodiments may be combined in a variety of different ways. The present disclosure encompasses any and all ways of combining these operations into a process.

It should be noted that although the flow charts provided herein show a specific order of method steps or operations, it is understood that the order of these steps may differ from what is depicted. Also two or more steps may be performed concurrently or with partial concurrence. Such variation will depend on the software and hardware systems chosen and on designer choice. It is understood that all such variations are within the scope of the present disclosure. Likewise, software and web implementations of the example embodiments could be accomplished with programming techniques with rule based logic and other logic to accomplish the various database searching steps, correlation steps, comparison steps and decision steps. It should also be noted that the word "module" as used herein and in the claims is intended to encompass implementations using one or more lines of software code, and/or hardware implementations, and/or manual operations.

While example embodiments have been described in conjunction with the example embodiments outlined above, it is evident that many alternatives, modifications and variations will be apparent to those skilled in the art. Accordingly, the example embodiments, as set forth above, are intended to be illustrative, not limiting. Various changes may be made without departing from the spirit and scope of the invention.

The invention claimed is:

1. A method comprising:
    accessing an advertisement database to obtain a plurality of advertisement media components;
    accessing an entertainment database to obtain a plurality of entertainment media components;
    interspersing the entertainment media components between the advertisement media components to provide viewer media content;
    communicating the viewer media content to a first user for viewing;
    monitoring a request from the first user to share at least one advertisement media component or at least one entertainment media component with a second user;
    selectively allocating an award associated with the shared media content when viewed by the second user;
    receiving an apportionment factor from one of the first user or the second user the apportionment factor identifying how the award is to be apportioned between the first user and the second user; and
    selectively apportioning the award between the first user and the second user based on the apportionment factor.

2. A computer-implemented method for advertising, the method comprising:
    hosting electronically a visual presentation that facilitates a playing of at least one from a plurality of advertising video works or a sequence of static images during a communication session with a first user;
    receiving a first signal indicating to play one of the advertising video works or sequence of static images;
    initiating presentation of a first advertising video work or sequence of static images in response to the first signal;
    receiving one or more second signals representing that the first user is viewing or has completed viewing the first advertising video work or the sequence of static images;
    monitoring a request from the first user to share the advertising video works or sequence of static images with a second user;
    selectively allocating an award when the advertising video works or sequence of static images is viewed by the second user;
    receiving an apportionment factor from one of the first user or the second user, the apportionment factor identifying how the award is to be apportioned between the first user and the second user; and
    selectively apportioning the award between the first user and the second user based on the apportionment factor.

3. The method of claim 2, comprising one or more operations selected from the group consisting of:

operating the first electronic process to award, when one or more first criteria are met related to receiving the one or more second signals, one or more sweepstakes entries, and operating the second electronic process to generate, when at least one second criteria relating to viewing is met, a notice of an award of a prize.

4. The method of claim 2, further comprising:

performing an electronic process to determine which one of advertising video works or a sequence of static images to play based on at least a number of times the person has logged in to the visual presentation site during a period; and initiating presentation of the one advertising video work or a sequence of static images.

5. The method of claim 2, further comprising generating a rotation of advertising video works or a sequence of static images of different advertisers and beginning in the rotation at a different advertising video work or a sequence of static images at every log-in by the same viewer during a period.

6. The method of claim 2, further comprising generating and presenting or having presented visually or aurally a request to initiate at least one of the one or more second signals.

7. The method of claim 2, comprising receiving a plurality of first signals over a period of time, wherein each different first signal represents that the viewer is viewing one or more of the advertising video works or a sequence of static images at a different discrete time.

8. The method of claim 3, wherein the second electronic process is performed and a notice of an award of a prize is presented on the visual presentation site, and presenting during the communication session an electronic method for accepting the prize; and facilitating award of the prize only if a signal is received within a period of time accepting the prize.

9. The method of claim 3, wherein the second criterion comprises a random award during a communication session with the person.

10. The method of claim 3, wherein the second criterion comprises a random award only after the presentation of an advertising video work or a sequence of static images.

11. The method of claim 2, further comprising:

receiving electronically a designation of a charity to receive the award; and facilitating awarding of the award to the charity.

12. The method of claim 2, further comprising:

interspersing electronically or playing at the same time entertainment sessions with the advertising video works or a sequence of static images during a communication session presented to a viewer; and providing electronically a control to allow the viewer to skip one or more of the advertising video works or a sequence of static images.

13. The method of claim 2, further comprising:

interspersing electronically or playing at the same time a particular entertainment session with the advertising video works or a sequence of static images during a communication session presented to a viewer;

determining a number of times that the particular entertainment session is played by the visual presentation site; and calculating an award based on the number of times the particular entertainment video work is played.

14. The method of claim 2, further comprising:

presenting during the session information designating ownership of the award calculated for the one entertainment figure to a charity.

15. The method of claim 2, further comprising:

presenting a selectable list of advertising video subjects;

receiving a selection of one of the advertising video subjects on the selectable list; and presenting one or more advertising video works or a sequence of static images on the visual presentation consistent with the received selection of the one advertising video subject.

16. The method of claim 2, further comprising:

obtaining information indicating one or more demographics of the viewer viewing the communication session; and selecting at least some of the video works based on the one or more demographics of the viewer.

17. The method of claim 2, further comprising:

performing an electronic method during a communication session to allow a viewer to submit a rating for one of the advertising video works or a sequence of static images; and receiving electronically rating information for the advertising video work or a sequence of static images.

18. The method of claim 2, further comprising:

accessing electronically a profile of the viewer;

obtaining from the profile an identification of at least one video work;

obtaining electronically at least one scene from the one video work identified; and presenting the scene to the viewer during the communication session.

19. The method of claim 2, further comprising:

receiving a permission from one or more persons to allow direct communication between an advertiser and the respective person; and facilitating that direct communication.

20. The method of claim 1, wherein the apportionment factor is a percentage.

21. The method of claim 1, further comprising:

causing a drop down menu to be displayed to the first user; and monitoring user selection of the apportionment factor from a plurality of apportionment factors provided by the drop down menu.

22. The method of claim 2, wherein the apportionment factor is a percentage.

23. The method of claim 2, further comprising:

causing a drop down menu to be displayed to the first user; and monitoring user selection of the apportionment factor from a plurality of apportionment factors provided by the drop down menu.

* * * * *